United States Patent
Dowling

(10) Patent No.: US 7,158,566 B2
(45) Date of Patent: Jan. 2, 2007

(54) HIGH-SPEED ADAPTIVE INTERCONNECT ARCHITECTURE WITH NONLINEAR ERROR FUNCTIONS

(76) Inventor: Eric Morgan Dowling, Interlinlz 731, P.O. Box 025635, Miami, FL (US) 33102-5635

(*) Notice: Subject to any disclaimer, the term of this patent is extended or adjusted under 35 U.S.C. 154(b) by 428 days.

(21) Appl. No.: 10/732,408

(22) Filed: Dec. 11, 2003

(65) Prior Publication Data

US 2005/0220185 A1    Oct. 6, 2005

Related U.S. Application Data

(63) Continuation-in-part of application No. 09/624,068, filed on Jul. 24, 2000, now Pat. No. 6,765,958.

(51) Int. Cl.
*H03H 7/30* (2006.01)
(52) U.S. Cl. ....................... 375/229
(58) Field of Classification Search ........... 375/229, 375/230, 231, 232, 233, 234, 235, 236, 350; 370/286, 289, 290, 291, 292; 341/143; 360/65; 708/322, 323
See application file for complete search history.

(56) References Cited

U.S. PATENT DOCUMENTS 5,459,432 A * 10/1995 White et al. ............... 329/307
6,298,362 B1 * 10/2001 Gu ............................. 708/323
6,480,534 B1 * 11/2002 Gatherer et al. ............ 375/229
2004/0062403 A1 * 4/2004 Gay ......................... 381/71.11

OTHER PUBLICATIONS

Ren et al. "Synthesizing Optimal Filters for Crosstalk-cancellation for High-Speed Buses", DAC 2003, Jun. 2-6, 2003, p. 592-597.*

* cited by examiner

*Primary Examiner*—Khanh Tran
*Assistant Examiner*—Sam K. Ahn
(74) *Attorney, Agent, or Firm*—Eric M. Dowling

(57) ABSTRACT

A low cost and high speed equalizing receiver structure is provided for improved inter-chip and inter-module communications. The receiver is able to recover data from a corrupted waveform from a signal wire such as one found on data, address or control wires in a microsystem architecture. The receiver can be used with binary as well as m-ary pulse amplitude modulation schemes. The receiver can be used to increase the sustainable data rate between chips or can be used to sustain a given data rate over a poorer quality channel as compared to prior art interconnect technologies. Methods for training and operating the receiver structure are provided. A novel structure called the decision feedback equalizer and cross talk canceller (DFE-CTC) is introduced and methods to compute the coefficients to minimize error in terms of the $l_2$ norm, the $l_\infty$ norm, and statistical probability of error functions are also disclosed.

25 Claims, 7 Drawing Sheets

HIGH-SPEED ADAPTIVE INTERCONNECT ARCHITECTURE WITH NONLINEAR ERROR FUNCTIONS

The present application is a continuation-in-part of U.S. patent application Ser. No. 09/624,068, filed Sep. Jul. 24, 2000, now U.S. Pat. No. 6,765,958, entitled "high speed adaptive interconnect architecture."

BACKGROUND OF THE INVENTION

1. Field of the Invention

This invention relates generally to VLSI circuits. More particularly, the invention relates to low cost receiver structures and methods to provide high-speed inter-chip or inter-module communication links. Also, the invention relates to the training and operation of non-linear adaptive structures to equalize and reduce cross-talk on high-speed wire traces and inter-wafer traces between chips or wafer sub-modules.

2. Description of the Related Art

Communication between chips on a circuit board traditionally use very simple binary zero-one logic. A high voltage is sent to represent a binary one, and a zero voltage is sent to represent a binary zero. The receiver maintains clock synchronization with the transmitter and at the appropriate time decides a binary one if the voltage on the communication wire is above a threshold and decides a binary zero if the voltage is below another threshold. More recently it has been proposed to use multilevel signaling such as pulse-amplitude modulation in order to increase the data rate between chips. U.S. Pat. No. 6,005,895 discusses such a scheme. Another multilevel signaling approach for inter-chip interconnects is described in J. Zerbe et al., "1.6 Gb/s/pin 4-PAM signaling and circuits for multi-drop bus," 2000 Symposium on VLSI Circuits, pp. 128–131, IEEE Press. This reference is referred to as the "Zerbe reference" henceforth.

While these multilevel signaling approaches are advantageous, inter-chip communication speeds are eventually limited by a phenomenon known in the art as "inter-symbol interference" or, "eye-closing." Eye closing occurs when distortions introduced by the communication channel make it impossible to discern the transmitted signal levels by sampling the received waveform. The so-called "eye" refers to a pattern observed on an oscilloscope. When the eye is open, distinct signal levels can be viewed. When the eye is closed, the signal levels have run together and therefore distinct signal values cannot be observed. The problem of eye closing becomes more severe on a given connection as the data rate is increased. While for a fixed data rate it may be possible to assure the eye will stay open for short and well engineered point-to-point connections, this is not the case for multi-drop busses and/or longer runs as may be needed to support various system topologies. In future wafer scale designs, the same problems may occur for longer runs between intra-wafer modules.

In the field of wireline and wireless communications, various approaches to recovering data streams from received waveforms having closed eyes are known. Typically equalizers are used to open the closed eye so that the data may be properly recovered. Equalization approaches are multiply-accumulate intensive and rely on DSP (digital signal processing). Hence prior art solutions are too expensive for inter-chip applications where the symbol rates are presently in the 800 MHz region. To cross beyond the 800 MHz barrier, improved equalizing receiver structures are needed, but these would need to be able to operate at symbol rates in excess of 800 MHz. Such high-speed equalizers might also need to be able to differentiate more than two signal levels in a multilevel PAM (pulse-amplitude modulation) scheme. Prior art DSP-based equalizers are not suited to solve such inter-chip equalization problems in a cost efficient way.

It would be desirable to have a receiver structure for inter-chip communications that could perform equalization to open a closed eye pattern in a received signal. It would be desirable if such a receiver could be low cost in terms of silicon area and power consumption. It would be desirable for the receiver to not require multiplications as are usually needed in equalizers, because multiplications are very expensive. It would be desirable to have a receiver structure that could loosen design constraints on the physical channel between the chips by allowing reliable communications over channels involving longer runs and multiple drops. This would allow a given data transfer rate to be supported over a wider variety of wire-routing topologies, thereby increasing design flexibility. It would also be desirable to have a receiver that could increase the sustainable data transfer rate on a well-engineered circuit path. Accompanying system level application architectures that make use of the high speed interconnect are also taught. Methods of training and operating the receivers and systems of the present invention are also developed.

SUMMARY OF THE INVENTION

The present invention overcomes difficulties with prior art inter-chip and inter-module interconnects by introducing a low cost and low power equalizing receiver structure for inter-chip communications. The novel receiver structure allows binary and multilevel signaling to be received at greater speeds and over more diverse paths by processing the received signal prior to signal symbol detection. The equalizer structure can inherently operate at high speeds due to its multiply-free architecture. Both serial and parallel circuit structures are taught. Either of these structures or a hybrid of the two can be selected in light of design constraints. Systems based on symbol-spaced and fractionally-spaced sampling are taught. The equalizer is adaptive, but only needs to be adapted at power-up and can be optionally retuned periodically.

BRIEF DESCRIPTION OF THE FIGURES

The various novel features of the present invention are illustrated in the figures listed below and described in the detailed description which follows.

DETAILED DESCRIPTION OF THE PREFERRED EMBODIMENTS

Figure 1:
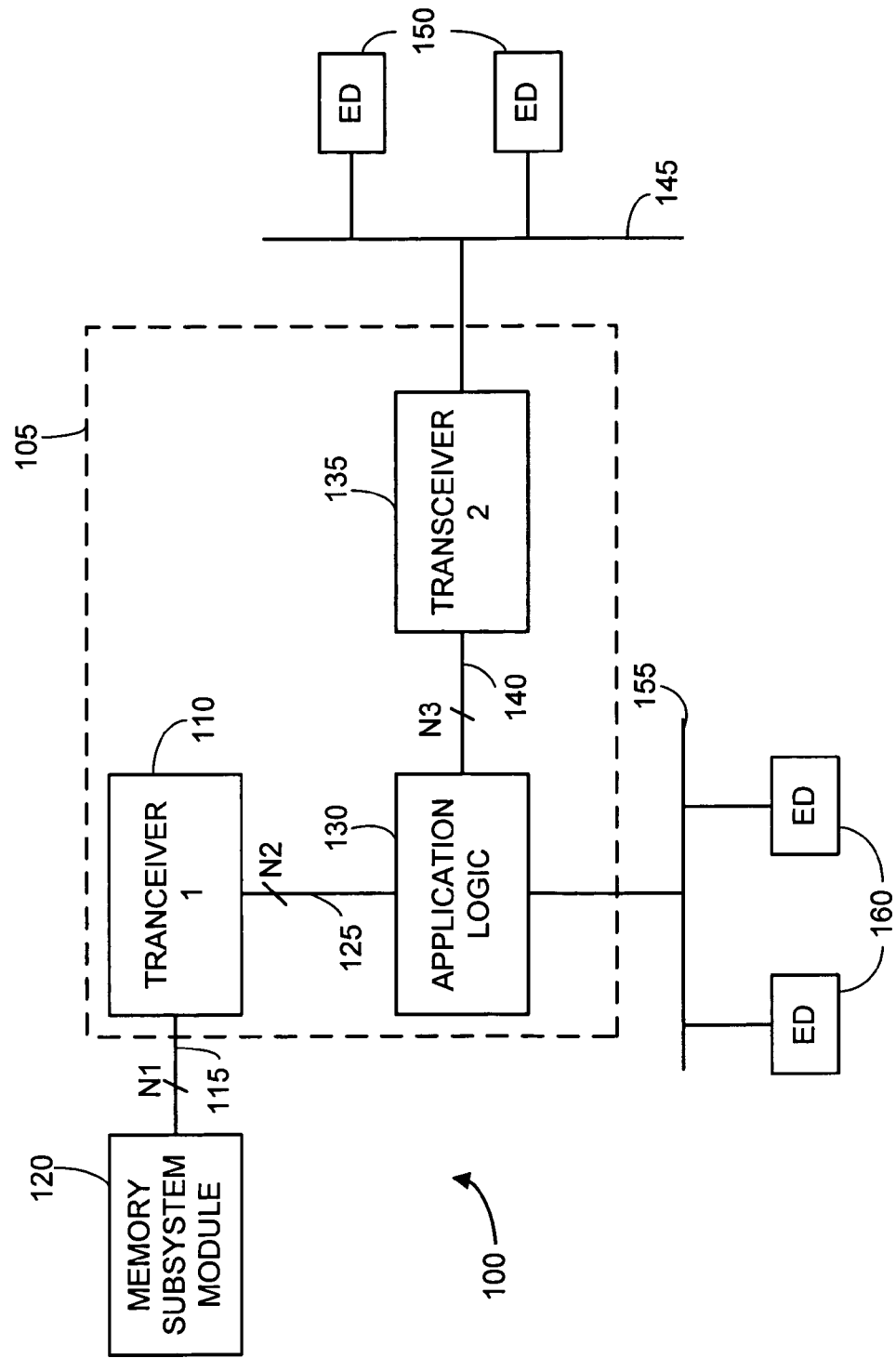
FIG. 1 is a block diagram illustrating a computer based system employing an inter-module interconnect that uses an equalizing receiver in accordance with the present invention.

FIG. 1 is a block diagram illustrating an exemplary electronic system 100 making use of a bus line receiver structure in accordance with the present invention. A processing device 105 is illustrated that may be implemented with various combinations of one or more bus receiver modules (110, 135 and logic coupling to bus 155). These modules may be implemented on one or more single chip dies. In a preferred embodiment the processing device 105 is implemented as a microsystem on a single die. In most preferred embodiments, the bus receiver modules also include transmit (write) capabilities and are technically "transceivers modules." As this application focuses mainly on the bus receiver aspect, these modules will be discussed as receivers, but at times may also be referred to as "transceivers." It is to be understood that the bus interconnects usually include both read and write capabilities. In this application it is assumed that the bus receiver is responsible, at least in part, for equalizing a corrupted received waveform.

A first receiver module 110 is coupled via a point-to-point high speed interconnect 115 to an external device 120 such as a memory subsystem module. The interconnect 115 involves one or more wires and is engineered for high-speed inter-chip data transmission. An example of such a point-to-point connection is a Rambus Inc. DRAM interconnect; for example see FIG. 3 and FIG. 9 of U.S. Pat. No. 5,638,334. The interconnect has $N_1$ wires, where $N_1$ is a selected nonnegative integer. This interconnect may use binary or multilevel signaling (e.g., multilevel PAM). Each such high speed interconnect wire for communicating among circuit modules is referred to herein as a "high-speed bus wire," and high speed signals carried thereon are referred to as "high-speed bus wire data signals." It is to be understood that such bus wires are for communicating with external circuit modules such as other chips on a circuit board or other subsystems on a wafer scale integrated system. Reliable communication with an external module at very high speeds (e.g., 800 MHz) requires processing to make correct symbol decisions. No such processing is required for internal communication within a circuit module.

The first receiver 110 is also coupled to an application logic module 130. The application logic module 130 typically involves a processor, gate array, custom or semi-custom logic circuits, depending on the end application of the system 100. A wide bus interconnect 125 is preferably used to transport data words assembled by the first receiver 110. The application logic module 110 is also coupled to a second receiver 135, preferably by a wide-bus interconnect 140. The second receiver 135 is coupled to a second high speed bus 145 similar to the point-to-point bus 115, but designed for multi-drop configurations. See the Zerbe reference for a discussion of examples of high speed multidrop busses that use binary and multilevel signaling. The second high speed bus 145 can connect to a plurality of external devices 150. The external devices 150 typically involve memories, other processors, or I/O devices.

The logic module 130 is also coupled via a standard bus interface to an external bus 155. The external bus 155 is similar in design to those found on microprocessors, microcontrollers, and DSPs for connecting to one or more external devices 160. The external devices 160 typically involve memories, other processors, or I/O devices. It should be noted that the present invention involves a system having at least one of the bus 115 or the bus 145 and the corresponding receiver 110 or 135. In a minimal embodiment only one of the bus 115, 145 is implemented and the implemented bus need only comprise a single inter-module wire for high-speed communication. This single wire can carry data and/or control signal information. Systems according to the present invention may include more than this minimal configuration, and the specific three-bus configuration of FIG. 1 is presented by way of example only.

The system 100 represents a computerized system architecture. Examples of computerized systems that can be implemented using this architecture include computer systems such as laptops, workstations and servers. The system 100 may also be used to implement embedded systems such as cell phones, hand held computing devices, Internet appliances, network routers, packet switches, communications switches, network processors, digital signal processing systems, high speed control, video and display systems, embedded processing systems, and other types of systems involving computerized processing.

In operation, the system 100 performs application processing. Data is received from at least one of the receiver 110 or the receiver 135 via a corresponding bus 115 or 145. Received data is sampled at each bus I/O pad and digitized. The raw data digitized at the I/O pad may optionally be pre-equalized with an analog equalizer circuit to do the best possible job of obtaining an input signal. However, if the input signal is viewed on an oscilloscope, the pre-equalized signal may have a closed eye pattern. By having a closed eye, it is meant that the noise margin at the optimal sampling instants is not within a specified range needed to maintain a specified bit error rate requirement.

The present invention is operative to post-process a digitized signal. The digitized signal involves a stream of sampled and quantized digital values derived from an analog waveform. The digitization can occur directly after the I/O pad or after any analog preprocessing circuitry that may be present (e.g., amplifier and/or preequalizer). The present invention is also operative to adaptively train the equalization subsystem to operate in an optimal fashion. The present invention is also operative to provide high-speed applications systems and processing methods using increased inter-module data rates. The structures and methods used to carry out the modes of operation of FIG. 1 are discussed in connection with FIGS. 2–7.

Figure 2:
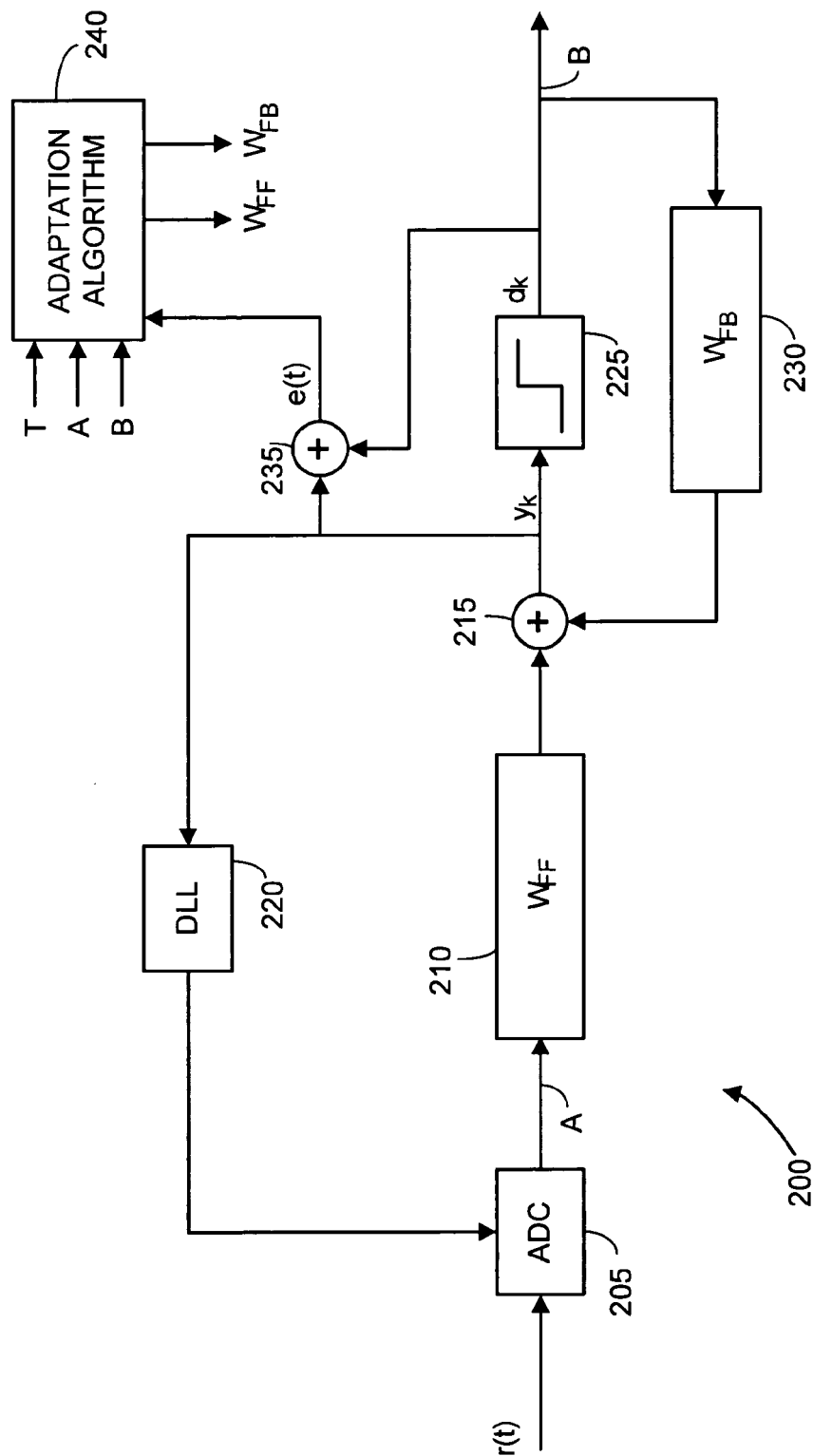
FIG. 2 is a block diagram illustrating the mathematics of adaptive equalization and provides a system level view of aspects of the present invention.

FIG. 2 is a block diagram illustrating the mathematics that govern aspects of the present invention. While this mathematical structure is common to many forms of equalizers, it is used to explain the theory and operation of the present invention as well as various novel features specific to the present invention. This figure also provides a system level view of aspects of the present invention.

An input bus wire data signal r(t) is received from an inter-module I/O bus wire. For example, this bus wire can be any of the I/O lines of the buses 115 or 145. Similarly it can be any inter-module wire used for high-speed communication in a microsystem. Most commonly, the bus wire is a wire of an inter-chip interconnect (e.g., 115, 145) but can be any wire running between chips or between modules in a wafer scale design, as long as it is used to carry high speed data. By "high speed data" it is meant that the data rate is so high that the eye pattern as viewed at the receiving pin or behind an analog pre-equalizer circuit may be sufficiently closed to violate a noise margin constraint imposed by a set of system design requirements. It should be noted that the signal r(t) represents an analog signal received at the input signal point (e.g., after the I/O pad or after an analog signal conditioning circuit).

The signal r(t) is routed into an ADC (analog to digital converter) 205. The ADC 205 may be designed in many ways. One example is the four-level ADC shown in FIG. 4 of the Zerbe reference. Similar but simplified structures can be designed to receive a two-level signal. Integrating and non-integrating two-level receivers are well known in the interconnect art. Any of these simple one or two bit converters may be used as the ADC 205.

One aspect of the present involves some specific ADC configurations that impact downstream processing in the receiver. It is known from the art of delta sigma analog-to-digital converters that input signals can be over-sampled, quantized to just two levels, and the quantized values can be reconstructed to produce a multi-bit output after some post processing involving a low pass filter. Hence in one configuration, the ADC involves a delta sigma converter that over-samples the input data stream to either two or four bits. In such cases the ADC involves a quantizer and a feedback circuit as are known in the delta sigma converter art. Both two-level and four level delta sigma converter architectures are known, and any such delta sigma ADC structure may be used for the ADC 205.

For use with the present invention, the over-sampling rate is normally chosen to be an integer in the range from one to sixteen, although higher rates are theoretically possible and are within the scope of the present invention. Because the symbol rate of the signal itself is on the order of 800 MHz or more, it is difficult to increase the oversampling rate much more that two to four times the symbol rate. However, it is anticipated that future systems may involve clock speeds that are higher and future systems may be limited by inter-module communications instead of on-chip clock rates. In such systems, the ADC 205 may be implemented to produce a two-level or four level output signal that is over-sampled by an appropriately chosen oversampling factor, OSF. The parameter OSF is chosen based on data rates and channel characteristics found in a given system and may be engineered using standard design practices.

To summarize, the output of the ADC may involve two-level or four-level digitized data. This digitized data may be directly quantized (e.g., an integrating A/D as in FIG. 4 of the Zerbe reference or a two-level variation). Alternatively, the digitized data may involve a delta sigma converter quantizer-output data stream (two-level or four-level coder output—e.g., the output of the block labeled "clock" in FIG. 9.15 of J. G. Proakis, et al., Digital Signal Processing, Principles, Algorithms and Applications, 3$^{rd}$ Ed., Prentice-Hall, 1996, the "Proakis reference" henceforth.). The delta-sigma quantized data stream is conventionally sent to a low-pass filter (delta sigma decoder) in order to recover a multilevel data value. Note that there are many encoder architectures for delta sigma ADC's and any of these may be used with the present invention. In the present invention, however, the quantized delta sigma data stream is fed into an equalizer structure in its over-sampled and quantized form. The present invention is preferably practiced where the ADC 205 generates and output stream quantized to either one or two bits (two levels or four levels). In some systems, recovered symbol values may be resolved to more levels than are provided by the quantizer in the ADC 205.

The output of the ADC 205 is coupled to a feed-forward filter 210. The feed-forward filter uses an FIR filter structure as is well known in the art. As will be discussed, because the ADC 205 generates one or two bit values, the feed-forward filter may be implemented with multiplier-free circuits. The output of the feed-forward filter is coupled to an optional summing circuit 215. The output of the summing circuit 215 is coupled to an optional delay locked loop 220. The delay locked look may be implemented with a phase locked loop, and the construction of such delay locked loops is well known to skilled artisans. See for example, Sidoropoulos et al., 2000 Symposium on VLSI Circuits, pp. 124,127, IEEE Press. The output of the delay locked loop 220 is coupled to the ADC 220 to control the sampling times. In some embodiments, especially those involving significant oversampling, the DLL may be omitted.

The output of the summing circuit 215 is also coupled to a decision device 225. The decision device quantizes the output of the summing circuit to a nearest symbol value at an appropriate symbol-sampling instant. The output of the decision device provides the recovered data output of the receiver structure. In systems where the sampling rate of the ADC 205 is OSF times the symbol rate, the symbol-sampling instant occurs once every OSF number of input samples. In some embodiments the decision device 225 may be replaced with a sequence detector such as one based on the Viterbi algorithm. However, due to the computational complexity of such devices, a direct signal slicer (e.g., quantize to nearest signal level) embodiment is considered to be preferred at this time. The output of the decision device 225 feeds to an optional feedback filter 230. The feedback filter 230 is used to implement a decision feedback equalizer structure. The output of the decision-feedback filter, when present, is coupled into a second input to the summer 215.

The feed-forward filter 210 and feedback filter 230 involve sets of coefficients, $W_{FF}$ and $W_{FB}$. These coefficients are determined by an adaptation algorithm module 240. The operation of the adaptation module 240 is discussed in detail in connection with FIG. 7. One embodiment whereby an error signal is developed in a differencing circuit 235 is illustrated. The adaptation algorithm can use various combinations of input values supplied by the ADC 205, past decisions, and training (known reference) signal values (T in FIG. 2) in order to compute $W_{FF}$ and $W_{FB}$ to minimize a measure of the error signal output from the differencing circuit 235 or a measure of the difference between the output of the summing circuit 215 and the set of known reference values. Example algorithms that can be applied include a direct solution of a matrix least squares problem (preferred for most embodiments of the present invention), or sequential algorithms to include least mean squares adaptation, recursive least squares adaptation, or error-back propagation. For a background discussion of adaptive algorithms, see "Adaptive Filtering" by Simon Haykin, Prentice-Hall.

The operation of the system 200 will now be discussed in broad terms. The input signal r(t) is received from an inter-module bit line such as an inter-chip bus wire. The ADC 205 samples this signal periodically either at the symbol rate or with an over-sampling factor, OSF. The data is quantized to either one or two bits, depending on the embodiment, and may include delta sigma encoding. The digitized information is fed to the feed-forward filter 210. The feed-forward filter output is processed using a multiplication free circuit structure adapted for equalization of very high data-rate signals. The output of the feed-forward filter is combined with the output of the optional decision feedback filter 230 to form a signal estimate. This signal estimate is then sliced to the nearest symbol value (by direct slicing or sequence estimation). The coefficients of the feed-forward and feedback filters are determined at power-up time using the adaptation algorithm 240. The estimation signal $y_k$ is optionally fed back to the DLL 220 to determine optimal sampling instances to control the ADC. In some embodiments a second DLL (not shown) can also be used to indicate the sampling instances for the decision device 225. This DLL selects its sampling times to minimize the power in the signal output from the differencing circuit 235.

Figure 3:
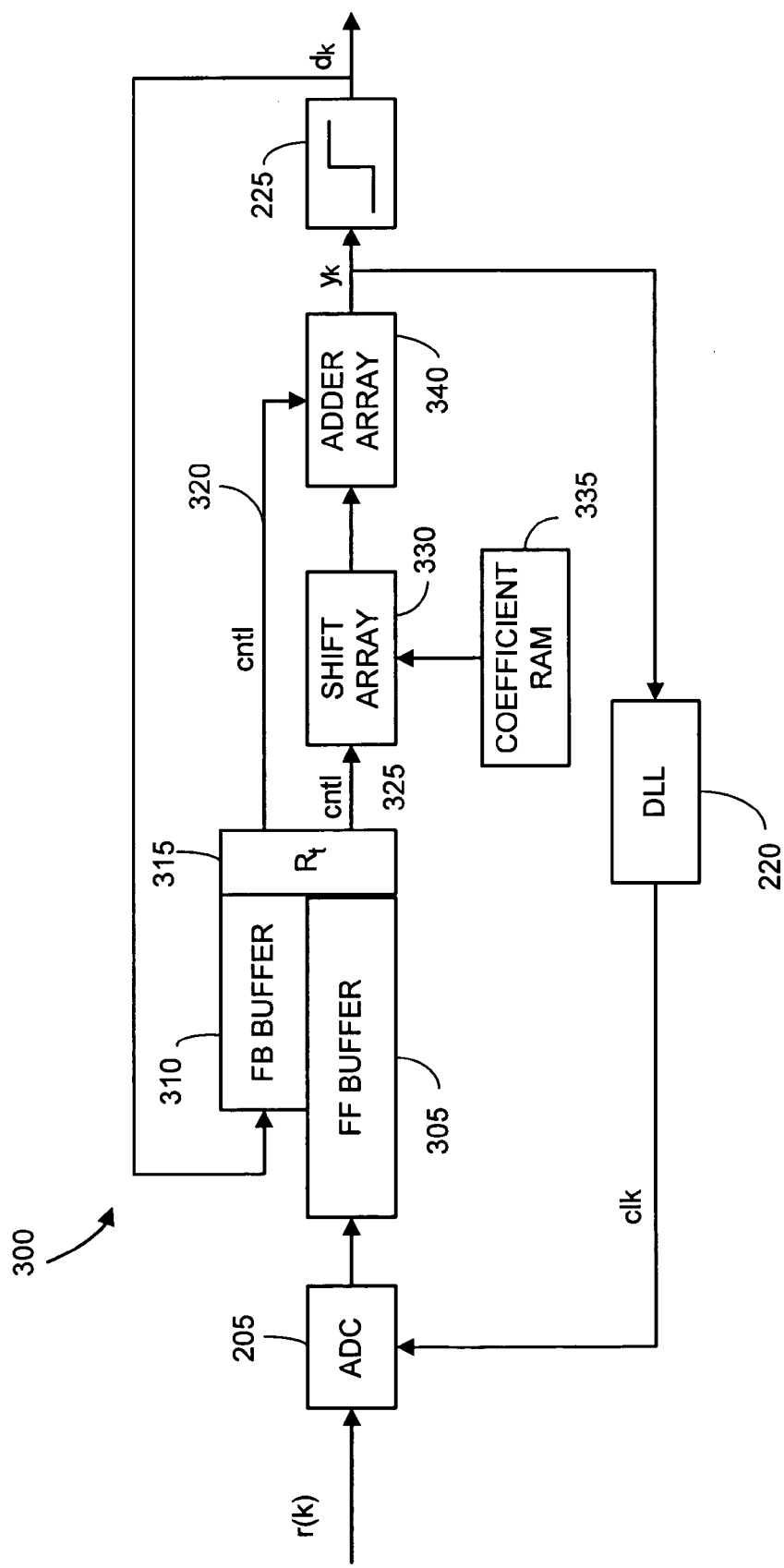
FIG. 3 is a block diagram illustrating a multiplier-free receiver structure for equalizing and recovering a corrupted data signal.

FIG. 3 is a block diagram illustrating a specific equalizing receiver structure in accordance with the present invention. A signal arriving from an inter-module bus wire is digitized by the ADC converter 205. The ADC 205 is discussed in detail in connection with FIG. 2. The n-bit output (n=1 or n=2) is sent to a feed-forward buffer 305. The feed-forward buffer 305 is typically implemented as either a physical tapped delay line shift register or a circularly addressed buffer. The feed-forward buffer 305 holds $N_{FF}$ samples of input data, where $N_{FF}$ is a nonnegative integer representing the FIR-filter order of the feed-forward filter 210. In preferred embodiments, the buffer 305 includes a parallel set of outputs so the entire contents can be read in a single cycle. In some embodiments where n=2, an output multiplexer is used in each sample position and the contents can thereby be read out in two cycles. In still other embodiments the contents are read out in $N_{FF}$ cycles, but this is not viewed as a preferred embodiment at this time based upon current circuit speeds.

The equalizing receiver structure 300 also includes an optional decision feedback data buffer 310. This data buffer stores previously recovered symbol-decisions. For example, with 2-level PAM, the symbol decisions comprise previously decided 1-bit data values. With 4-level PAM, the symbol decisions comprise previously decided 2-bit data values. The outputs of the feed-forward buffer 305 and the feedback buffer 310 are coupled through a routing network 315 to control an optional shift array 330 and an adder tree 340. The optional shift array receives control inputs from the routing network 315 and data values from a coefficient RAM 335. The coefficient RAM stores the filter coefficient vector $W_{FF}$ and, when decision feedback is implemented, $W_{FB}$. The data output of the shift array 320 is coupled to an adder array 340. When the shift array 320 is not implemented, the output of the coefficient RAM 335 couples directly into the adder array 340. The output of the adder array couples to the decision circuit 225 and to the optional DLL 220.

In some systems, some of the coefficients stored in the coefficient RAM 335 rout to the shift array 330 while other coefficients route directly to the adder array 320. This occurs, for example when the feedforward buffer 305 holds 1-bit data and the feedback buffer 310 stores 2-bit symbol decision values (e.g., 4-level PAM symbol decisions). In such cases, the shift array may be viewed as having hard-wired empty shift cells (straight-through routing) that selectively always decides not to shift certain coefficients. For coefficients that may be shifted in this example, these coefficient values route through a shifter that selectively shifts or does not shift based on a value in the feedback buffer.

The routing network 315 may be implemented in a number of ways. In one type of embodiment, the feed-forward buffer and the feedback buffers are implemented with serial shift register paths (one or more bits wide). In this case the routing network 315 comprises fixed connections that route buffer output values to appropriate control inputs to the shift array 320 and/or the adder array 340 as is discussed in connection with FIG. 4 and FIG. 5. In embodiments where circular addressing is used, the routing network may be used to route the control inputs to the shift array 330 and/or the adder array 340 over switched connections. In still another type embodiment, the router network 315 may involve fixed control connections and the coefficient RAM outputs may be sequenced to route to the appropriate data input to the shift array 330 or the adder array 340. This type of embodiment is not preferred in many cases because it the coefficient data width is usually wider than the widths of the words stored in the feed-forward and feedback buffers.

The operation of the equalizing receiver 300 will be discussed subsequently in light of the discussions of FIGS. 4–7.

Figure 4:
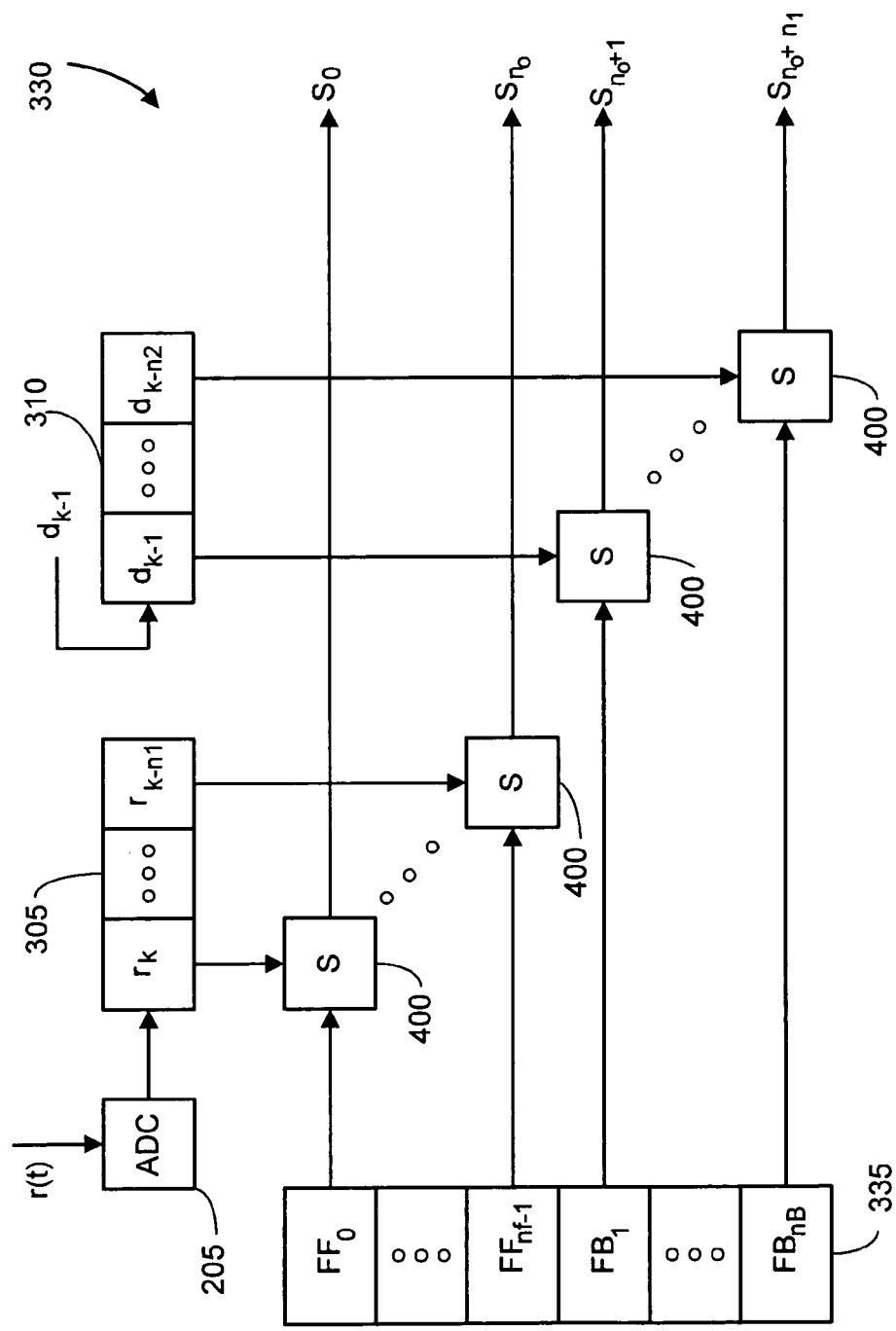
FIG. 4 is a block diagram illustrating an embodiment of a shift array.

FIG. 4 illustrates an embodiment of the shift array 330. In this embodiment, the buffers 305 and 310 are implemented as serial shift registers, two bits wide, with parallel outputs. The four bit values can be considered to take on the values $\{-2, -1, 1, 2\}$. While other encodings would be obvious to those skilled in the art, for simplicity of discussion, each two bit value in the buffers 305, 310 is considered to be in sign-magnitude form with one sign bit and one magnitude bit.

The coefficient RAM 335 is shown as a parallel output device whose output values couple each to a shift device 400. The coefficient RAM stores the elements of the feed-forward and feedback coefficient vectors, $W_{FF}$ and $W_{FB}$. The shift array is optional because embodiments can be developed where the ADC 205 quantizes data values to only one bit. In this case the one-bit digital values are considered to take on the two values $\{-1, 1\}$.

In systems where the input ADC 205 quantizes the input waveform to two bits, the magnitude bit is applied to a control input of each shifter 400. If the magnitude bit has a one value, the shifter performs a left arithmetic shift of one bit. If the magnitude bit has a zero value, the shifter does not perform any shift.

In some systems a two's complement shifter can be used. In such embodiments the sign bit is also applied to the shifter. If the sign bit is a one, then the shifter additionally computes the two's complement negation of the input. If the sign bit is a zero, no two's complement arithmetic negation is computed. In systems where only one bit is used, the shifter 400 does not shift but only performs the two's complement negation function. As will be discussed, the two's complement negation function can optionally be implemented in the adder array.

It should be noted that the coefficient RAM 335 may be viewed as a smart memory with computationally modifiable outputs. Associated with each shifter 400 is a coefficient memory location. The shifter 400 may be viewed as an output circuit for the corresponding coefficient memory word. The smart memory outputs a coefficient that may optionally be shifted and negated in accordance with the associated control inputs that are stored in the buffers 305 and/or 310. Instead of running address lines to the memory, the control inputs tell how to preprocess the memory contents for subsequent accumulation. As is discussed in connection with FIG. 6, in some systems the output preprocessing circuits may be shared by multiple memory locations. In such systems address lines are used to sequence the coefficients out from a collection of locations through an output preprocessing circuit. The preprocessed outputs are then accumulated using a circuit as discussed in connection with FIG. 6.

Figure 5:
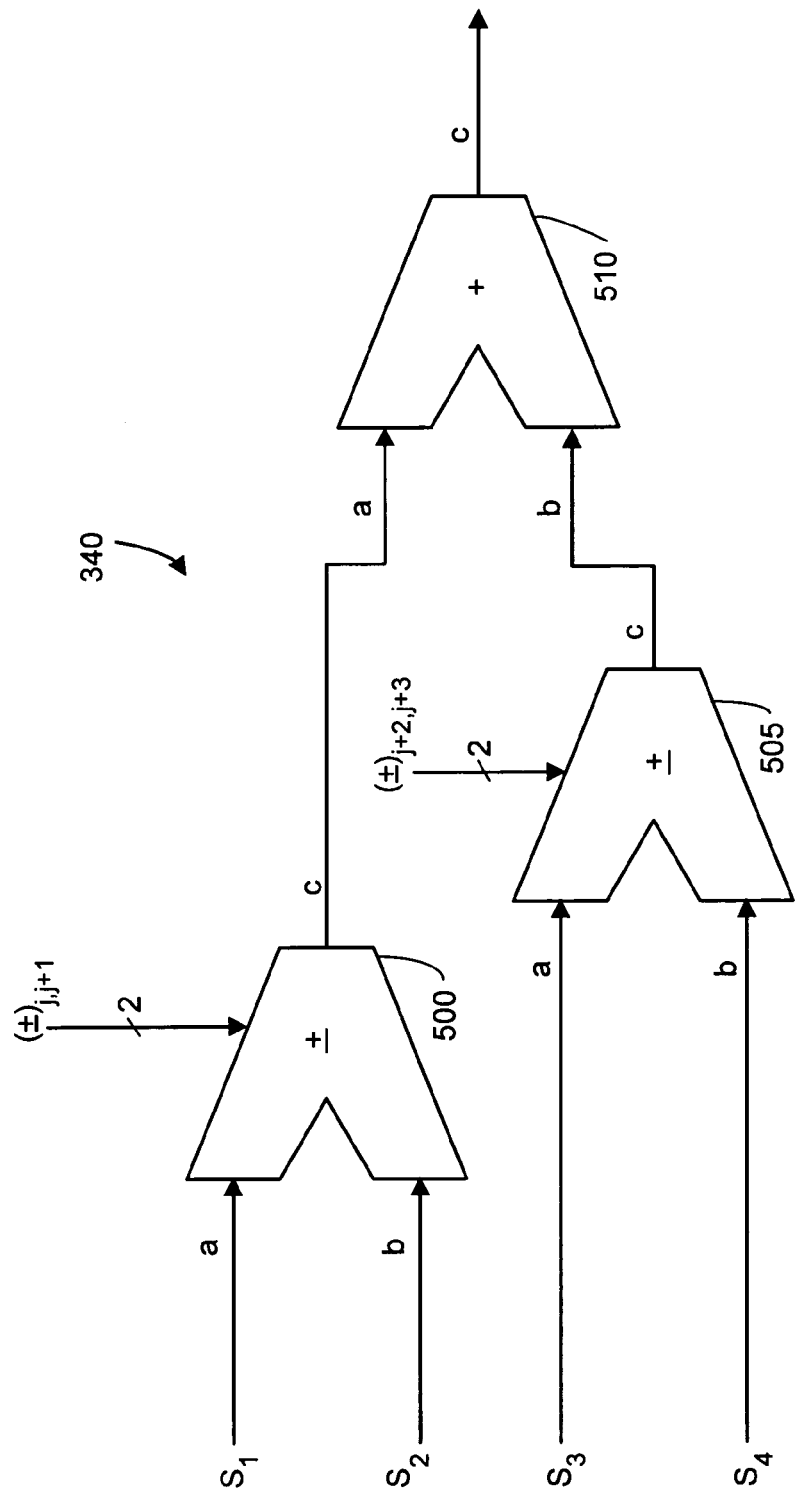
FIG. 5 is block diagram illustrating an embodiment of a tree adder/subtractor array.

Referring now to FIG. 5, an embodiment of a portion of the adder array 340 is illustrated in block diagram form. The data inputs to the adder array correspond to the outputs of the shifters 400. If the shifters 400 are not implemented, then the data inputs come directly from the outputs of the coefficient RAM 335. The illustrative embodiment of the adder array uses a binary tree architecture, although other architectures may be implemented as discussed in connection with FIG. 6.

In the illustrative embodiment, the adder array is designed to combine four inputs, $S_1$, $S_2$, $S_3$ and $S_4$. As is well known, larger binary tree adder structures can be similarly constructed to combine more than four inputs. In general $\log_2(N)$ cascaded stages of adders are needed to combine N inputs. Note that the adder of FIG. 5 combines four inputs and involves $\log_2(4)=2$ cascaded stages.

If the shifters 400 are implemented that perform two's complement negation, then all the array adder needs to do is add the four inputs together. If the shifters 400 are not used, or if the shifters 400 perform shifting but not two's complement negation, then the adder array 340 needs to compute a linear combination of $S_1$, $S_2$, $S_3$ and $S_4$ involving both additions and subtractions. The embodiment shown in FIG. 5 assumes that the shifters do not perform two's complement negation. As will be discussed, the illustrative embodiment of FIG. 5 can be readily simplified for the case where the shifters 400 do perform two's complement negation.

The first cascaded stage of the adder array 340 involves two adders 500 and 505. The inputs of these adders are coupled to the outputs of the shifters 400 (when present, the coefficient RAM otherwise). The outputs of the adders 500 and 505 couple to the inputs of a third adder 510. The third adder 510 is in the second cascaded stage of the adder array. Under the assumption that the shifters do not perform two's complement negation, each adder in the first stage receives two control bits. These control bits correspond to sign bits of entries in the data buffers 305 and 310. Similarly to FIG. 4, these sign bits route down from a corresponding location in one of the data buffers 305, 310 to the adder receiving the corresponding coefficient as an input. If the two sign-bit control inputs are (0,0) the adder 500 computes c=a+b. If the control inputs are (0,1) the adder 500 computes c=a−b. If the control inputs are (1,0), the adder 500 computes c=−a+b. If the control inputs are (1,1), the adder 500 computes c=−a−b. The adder 505 works similarly. The adder 510 always computes c=a+b. Skilled artisans will see readily see that other combinations of the control inputs can be applied to adders in different stages to produce the same results. All such embodiments are within the scope of the present invention. The adder array of FIG. 5 is shown by way of example only. As mentioned previously, if two' complement negation is applied in the shifters 400, then all of the adders can be replaced with simpler adders that only computer c=a+b.

The adder tree may also be considered to be a part of a smart memory output circuit. The coefficients are read out of memory either all in parallel, serially, or subsets are read in parallel and processed sequentially. This is discussed in further detail in connection with FIG. 6. The output circuits of the smart memory are operative to selectively shift and negate the each coefficient memory word as it is read out of the smart memory. The adder tree extends this smart-memory output circuitry to combine the outputs into a linear combination of the coefficients to develop, at time k, the output $y_k$.

Figure 6:
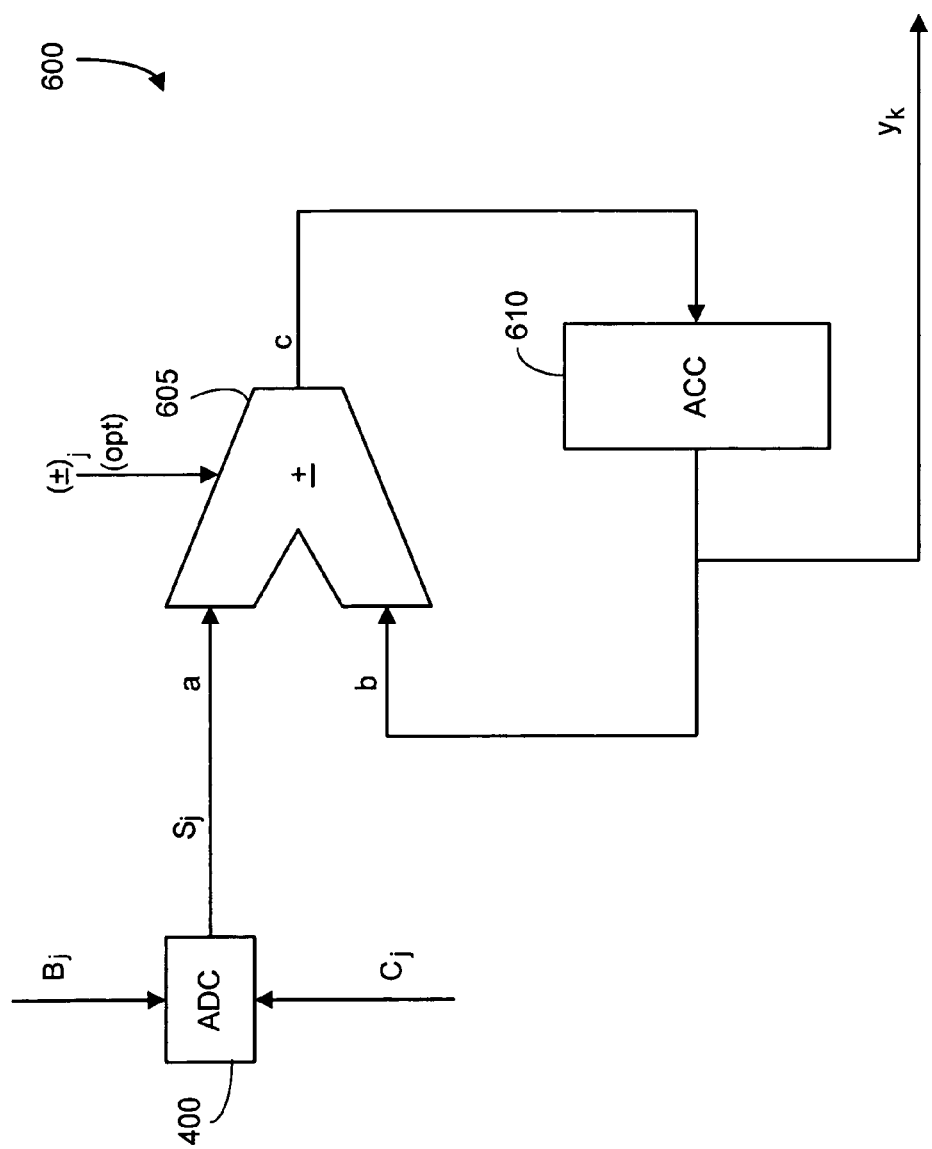
FIG. 6 is a block diagram illustrating a serial logic based structure for multiplier-free data filtering.

Referring now to FIG. 6, an optional sequential processing circuit 600 is illustrated for the accumulation function. The sequential processing circuit may be used instead of or in combination with the adder array 340. In a purely sequential embodiment, coefficients are sequenced out of memory along with the corresponding value from the data buffer to perform convolution based filtering. Known FIR filtering addressing schemes for shifted arrays or circular buffers can be used to ensure the coefficients and the data buffer values in an appropriately synchronized fashion to achieve convolution-based FIR feed-forward and decision feedback filtering.

When the synchronized pair of coefficient value and data buffer value meet at the optional shifter 400, the coefficient is shifted or not shifted according to the magnitude bit in the data buffer (if four level input sampling is used). The output of the shifter 400 is coupled to an adder/subtractor 605. If the corresponding data-buffer value's sign bit is one, the adder/subtractor computes c=b−a, otherwise it computes c=a+b. The output of the adder/subtractor is coupled to an accumulator register 610. This circuit can be clocked N times to combine N coefficients to form the required FIR feed-forward and feedback convolution sums to produce the output of the summing device 215.

As discussed previously, the shifter 400 can also be designed to perform negation. In such a case, both the magnitude and sign bits are sent to the shifter 400 and a simple adder that computes c=a+b is used. When the input data is sampled to only one bit, the this type of shifter embodiment would only receive the sign bit and would thus only perform the selective negation operation but not selective shifting.

Note that in general the sequential accumulator circuit 600 can compute a sum of $N_2$ terms using a single adder/subtractor. The adder array 340 can thus be constructed using a combination of binary tree adder structures such as shown in FIG. 5 and sequential accumulator structures as shown in FIG. 6. For example, the first level adders 500, 510 can be replaced by the circuit 600 to form a partial accumulation value instead of using the two adder circuits 500, 510. These concepts can be applied to replace any $N_2$ adders with a single accumulator circuit. The accumulator outputs can then be sent to successive stages employing individual adders or sequential accumulation circuits to add together the partial results. Using this approach, an adder array can be designed to provide a given tradeoff between clock cycles and silicon area. The full binary tree adder requires the fewest clock cycles and the most silicon area. The sequential accumulator requires the most clock cycles but the least silicon area. Hybrid parallel/sequential circuits fall somewhere in between and can be designed to meet a given design constraint. A major constraint is the circuit will have very few clock cycles to computer each output because the symbol rate will be very high, e.g. 800 MHz using today's technology. In the future, however, inter-chip communications physics will remain the same while on-chip clock speeds will scale upwards. Hence future systems will have a greater ability to trade silicon area for clock cycles.

Figure 7:
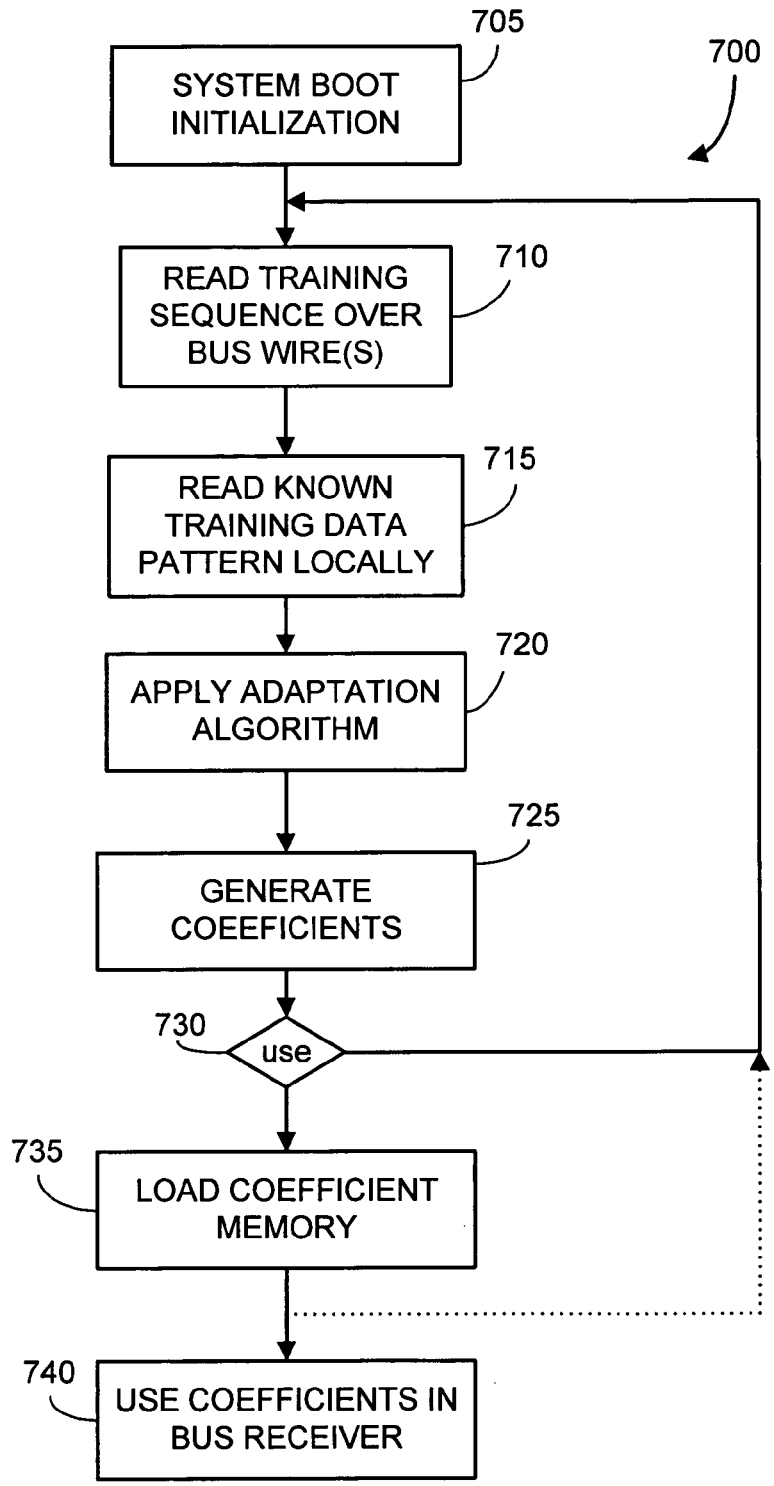
FIG. 7 is a flow chart illustrating a method of training and operating the present invention for use in high-speed applications processing.

Referring now to FIG. 7, a method 700 of operating the equalizing receiver structure 300 is illustrated in flow chart form. In a first step 705, initial boot procedures are executed to initialize the processing state of the processor 105. System boot procedures normally performed use the standard bus 155 or on-chip memory to support initial program execution and system configuration. Initially the transceivers 110 or 135 can operate the data paths 115 and/or 140 at lower speeds in order to read and write data reliably. For example, if the memory subsystem module 120 is a DRAM array, during boot time the transceiver 110 may write a known reference sequence out to the DRAM array. In some cases external devices may store a reference sequence in nonvolatile memory to avoid the need to write out a reference sequence.

Once certain boot procedures are performed, and usually as a part of an overall system boot procedure, control next passes to a step 710. In the step 710 the reference sequence is read over a high-speed wire or bus such as the bus 115. This sequence is read at a target operating speed and is digitized by the ADC 205. Control next passes to a step 715 where a locally available version of the reference pattern accessed from memory. Preferably the training pattern involves a symbol sequence comprising two level of four level data (two bits per symbol, interpreted as either $\{-1, 1\}$ or $\{-2, -1, 1, 2\}$).

Control next passes to a step 720 where an adaptation algorithm is applied. In a preferred embodiment, a matrix least squares problem is solved. The problem is set up as follows. Suppose there are N values in the training sequence, and that $W_{FF}$ has $N_{FF}$ elements and $W_{FB}$ has $N_{FB}$ elements. Then a matrix $A \in R^{N \times (N_{FF}+N_{FB})}$ is constructed whose $k^{th}$ row contains the contents of the data buffer 305 at time k based on the sampled input. The $k^{th}$ row also contains the contents of the data buffer 310 at time k. That is, the $k^{th}$ row is formed by augmenting the contents of the buffer 305 with the contents of the buffer 310. The contents of the data buffer 310 are derived from "previously decided" samples drawn directly from the set of known reference values (training sequence). It can be noted that the matrix A may be constructed in many ways depending on the exact ordering of elements in the $k^{th}$ row, but in many embodiments a block Toeplitz or a block Hankel matrix will result. Next a vector $b \in R^N$ is constructed, also using known reference values of the training sequence. The $k^{th}$ element of the vector b contains the correct decision the equalizing receiver is supposed to make at time k.

Control next passes to a step 725 where the filter coefficients are derived. Preferably a matrix least squares problem of the form Ax=b is solved for a least squares solution vector x. With the problem so constructed, the first $N_{FF}$ elements of x correspond to $W_{FF}$ and the next $N_{FB}$ elements of x correspond to $W_{FB}$. Many approaches are known to solve matrix least squares problems are known in the art and, any of these can be used.

While the aforementioned matrix least squares solution is deemed to be preferable, other methods may also be applied. For example LMS or RLS adaptive filtering algorithms may be applied. In general any adaptive filtering algorithm that computes filter coefficients to cause an input signal to be matched to a known data sequence may be used. Blind adaptive filters or neural network methods may also be applied but are not deemed to be the best approach for use with the present invention. It can be noted that when recursive adaptation algorithms are used, the steps 710, 715, 720 and 725 occur in a looped and interleaved fashion. Such solutions are well known in the art (see the LMS and RLS algorithms, for example).

Control next passes to an optional decision-step 730. The decision step 730 decides whether the residual error of the least squares problem, e=b−Ax has a small enough average magnitude. Alternatively, the step 730 runs a second training sequence through the system and measures the residual error of the recovered waveform, $y_k$, in FIG. 2 and FIG. 3 (output of 235). If the error is sufficiently small enough to meet a bit error rate criterion, then the set is accepted. Otherwise the steps 710–725 are repeated using a different data rate. Different speeds can be checked by starting at a target highest speed, working down until a speed is found that meets requirements. Alternatively the process can start with a lower speed and keep working up until a speed is reached where the system will not meet the bit error rate requirement. In either case, the set of coefficients that work at the highest possible speed are preferably selected and the system is preferably operated at top speed. For power consumption reasons, more than one set of coefficients may be maintained to operate the bus at different speeds because full speed may not be needed in all cases. At lower speeds, it may be possible to simply digitize the output of the ADC 205 as the symbol decision because the eye of the input waveform may not be closed. In such cases the receiver 300 may be optionally bypassed and put in a sleep mode.

Note that when multiple bus wires are used, the steps 710–730 may proceed in parallel. The same training information may be used for each wire, or different training signals may be used for different wires. The steps 720 and 725 are typically performed in a time-multiplexed order. Although more computationally expensive, the data buffer 305 can be expanded to include samples from one or more adjacent wires. In such a system the aforementioned matrix-based training algorithm will derive a set of weights for these taps to minimize cross talk. In such systems the buffer 305 is fed from multiple input sources using the same approach as is illustrated at the top of FIG. 4. In this type of embodiment the feed-forward buffer receives inputs from multiple ADCs in order to combat cross talk. In such systems the training data is collected in parallel and different training signals are used on adjacent wires. The training is otherwise performed in the same manner as described above. In this embodiment matrix row still contains the contents of the buffers 305 and 310, but the source of the information in the buffer 305 comes from more than one ADC. Similarly, one or more decisions from adjacent channels may be fed back to the decision buffer 310 so that the decision feedback portion of the equalizer can take into account latent cross talk effects due to previously detected symbols. Such embodiments are optional. If a matrix least squares training algorithm is used, the matrix A is developed as discussed above by concatenating the buffers 305 and 310 together. In this construction the buffers 305 and 310 include tapped-delay line sub-buffers involving inputs fed from multiple ADC's. Viewed another way, a row is formed by augmenting the row formed by concatenating the buffers 305 and 310 from a given I/O channel. To this row are concatenated at least portions of the buffers 305 and or 310 from at least one other channel. Again, the exact ordering of data elements in a row is a design choice.

Control next passes to a step 735 where the coefficients are loaded into coefficient memory for system use in the coefficient RAM 335. When the optional step 730 is used, the step 735 may be performed as a part of the step 730.

Control next passes to a step 740 where the system 100 is operated using the receiver structure 300 in at least one of the transceivers 110 or 135. The receiver 300 performs equalization using the trained coefficient sets $W_{FF}$ and/or $W_{FB}$. The system operates in a multiplier-free manner to open a closed eye on a inter-module wire such as a high-speed inter-chip bus wire. This method allows systems to be constructed and operated that can dedicate some silicon area to attain increased inter-module data rates, thereby increasing overall system performance.

Although not shown, the error as measured at the output of the differencing circuit 235 may be periodically or continuously monitored during system operation. In one embodiment, the differencing circuit 235 is implemented in hardware and is used to accumulate and error level by passing the error magnitudes to a first order recursive (IIR) filter. If the error level exceeds a threshold, an interrupt is generated and training is performed again for one or more bus wires to bring the system back into alignment. This feature is also optional. One example of a way to maintain an error level in a multiplier-free way is to use a recursive filter of the form $p_m=(1-2^{-7})Pk_{-1}+|e_k|$. In 8-bit arithmetic, this only requires a shift-add operation. Saturating arithmetic may also be used, and that involves an extra operation for saturation control.

Now that the system and its operation have been described, a specific preferred mode of operation will be discussed in light of FIGS. 1–7. In a preferred mode of operation the ADC 205 is selected to be an oversampling delta sigma encoder. The quantizer in the delta sigma encoder is selected to be either two or four bits. The oversampling rate is typically chosen to be an integer, OSF, between one and sixteen. Based on present technological constraints, suppose the OSF parameter is set to two or four. This causes the data-clocking rate into the buffer 305 to be two or four times the symbol rate. If the serial type shifter/negator/accumulator 600 is used, running accumulations using two or four cycles each may be produced during a data symbol interval. This reduces the amount of hardware needed to implement the adder array 340. Still, no multipliers are required, just simple one-bit shift devices and add/subtract type circuits.

The delta sigma data stream output from the ADC 205 is noisy, but the feed-forward filter $W_{FF}$ has been adapted during training to take this into account. The fact that a delta sigma converter has been used allows the system to recover information with greater reliability and fidelity than when it was originally sampled. In essence, the delta sigma decoder is itself a decision feedback equalizer instead of a simple low pass filter. While sigma delta converters are normally designed to recover a large number of bits, the present invention is only concerned with recovering a small number of bits reliably. The sigma delta converter at the input allows equalization to be performed at very high clock rates with very simple hardware. When the input symbol rate is on the order of 800 MHz or higher, and when a given chip may require eight to thirty-two or more receivers for a given high speed bus, an architecture that can operate at very high clock rates with a minimum silicon footprint becomes crucial. This is achieved by the present invention by sampling (possibly oversampling) an input signal with a very low resolution and passing the signal through a high-speed, low complexity equalization device.

Another aspect of the present invention involves a mode of operation for the multi-drop bus 145. The receiver 135 may be required to receive signals that originate from more than one high-speed data source 150. In such cases the channel characteristics between the receiver 135 and each of the high-speed data sources 150 will generally be different. In such cases different sets of coefficients are preferably developed for each channel. The method 700 is carried out as illustrated in FIG. 7, but an extra feedback path (multi-drop) is provided from the step 735 to the step 710. The same receiver structure 300 is used, but the coefficient RAM 335 selectively outputs an appropriate set of coefficient values depending on from which of the sources 150 data is being received. In terms of FIG. 4, this involves adding standard memory addressing and output multiplexing circuits to the coefficient RAM 335. The construction of addressable memories is well known in the art.

All of the disclosure provided above was in the parent application. The disclosure below was added to the CIP application.

Referring again to FIG. 7, an alternative embodiment of the method 700 of operating the equalizing receiver structure 300 is illustrated in flow chart form. Any of the aforementioned disclosure regarding FIGS. 1–6 can also be used with the embodiment of the method 700 discussed hereinbelow. As discussed above in connection with FIG. 7, the equalizing receiver 300 can be configured to perform cross talk elimination as well as equalization. This embodiment of the method 700 is focuses on a specific system involving DFE's (decision feedback equalizers) and preferably cross talk elimination processing. We introduce the term DFE-CTC to mean a DFE (decision feedback equalizer) and CTC (cross talk canceller). The DFE-CTC was introduced in the parent application (but the term DFE-CTC is added herein in the CIP application for convenience of further discussion), where we noted cross talk could be cancelled by generating filter coefficients for a plurality of feed forward filter channels and one or more decision feedback channels. In some of the new embodiments of the CIP application, feed forward and preferably feedback filter coefficients are derived to minimize the $l_\infty$ norm of an error signal produced by a set of training data. As we show, even though the algorithm involves nonlinear decision elements and feedback paths, the optimization problem can be constructed as an over-constrained multi-input feed forward only linear system linear and solved using linear programming techniques. This is similar to the way the least squares problem was set up in connection with FIG. 7 as discussed in the parent application. This takes away the nonlinearity of the decision and feedback process from the computation of the filter coefficients. As such, a solution that minimizes the $l_\infty$ norm of the residual error (e=b−Ax) may be obtained using linear programming techniques as we demonstrate hereinbelow.

Likewise, a non-linear optimization algorithm may be used to compute the DFE-CTC filter coefficients to minimize the $l_\infty$ norm or, more generally, a nonlinear function of the coefficients such a statistical error function. For example, it is well know how to use a Q function to represent the statistical bit error probability of the output of a linear filter. A Q function integrates over the tail of a Gaussian distribution in order to determine a bit error probability. Other statistical error functions are known in communication theory to deal with non-Gaussian distributions and the like. In such cases, the present invention minimizes the appropriate non-linear statistical error function over a set of training data using a nonlinear optimization algorithm such as Shanno's algorithm, a nonlinear conjugate gradient algorithm, or a neural network, for example. Most typically, the nonlinear optimization is carried out iteratively to converge to a solution using well known techniques of nonlinear optimization and/or neural networks. Because this vast science with many textbooks and well known techniques, we will not repeat the specifics of the particular nonlinear optimization algorithms that can be used. However, one of ordinary skill in the art would know how to construct a nonlinear optimization algorithm or use available nonlinear optimization or neural network software packages or APIs (application programmer interfaces whereby the programmer passes a set of variables and data to a pre-programmed nonlinear optimization software function). Moreover, one of ordinary skill in the art would be able to copy the statistical bit error probability function for a given modulation type such as 2-level PAM or 4-level PAM out of a technical article or a textbook. Because of this, and because of the variability of modulation types, noise probability density functions, and nonlinear optimization algorithms, we specify the general methods and discuss a particular example involving binary signaling and Gaussian distribution functions and a few selected nonlinear optimization algorithms.

So the present invention teaches one of ordinary skill in the art to go to an article or a text book, select the appropriate modulation type, statistical error probability density function (PDF), statistical error probability function (e.g., Q-function that integrates the PDF over one or more error regions), express the statistical error function in terms of the DFE-CTC filter coefficients, and to then apply a nonlinear optimization algorithm of choice (e.g., Shanno's algorithm, nonlinear conjugate gradient algorithm, or a neural network algorithm) to solve for the DFE-CTC filter coefficients that minimize the appropriate statistical error probability function over a set of training data. As discussed below, for the set of training data, the decision values are known, so the nonlinear decision operations and the feedback paths can be modeled as a multi-input feed forward problem. The multiple inputs comprise the sampled data from the ADC's 205 from a collection of wires, and one or more decision feedback paths that are modeled as feed forward paths driven by known decision data. Using this problem formulation and solution method, one of ordinary skill in the art can compute the DFE-CTC coefficients to minimize the error probability of the modulation type being communicated across the bus (e.g., 2-level PAM or 4-level PAM).

The present invention contemplates that while the $l_\infty$ norm solution will outperform the $l_2$ norm solution in most cases, the optimum will be to directly minimize the statistical error probability function using a non-linear optimization algorithm. While this may not be practical for many types of adaptive filtering oriented communication problems, it is very practical for hard-wired bus communication systems because the parameters can be computed initially using off-line methods and locked in, for example, at the factory. Because the non-linear optimization algorithms that operate over training data are iterative, even if fine tuning is desired at a later time, the previously computed solution can be used as a starting point, and a relatively few number of iterations will be needed to make any needed adjustments, either on-line or off-line. That is, the decisions may be fed back or another set of training data may be used. One or more iterations of the nonlinear optimization algorithm may then be applied to a block of data. In such case, a block adaptive non-linear algorithm results. Such algorithms are known in the art and have been tested and evaluated and shown to provide very high performance in CDMA equalization and interference suppression problems, for example.

It was noted by Ren and Greenstreet in DAC-2003, Jun. 2–6, "Synthesizing optimal filters for cross-talk cancellation for high speed busses," (the "Ren reference" henceforth) that equalization and cross talk cancellation problems can be solved over the $l_\infty$ norm using linear programming techniques. The minimization of the $l_2$ norm corresponds to the exemplary embodiment provided in the parent application involving the least squares method to solve for the coefficients. The parent application also disclosed that other methods such as neural network methods could be applied instead of the least squares method, although those embodiments were not considered to be the disclosed as being the preferred embodiment at that time. It can be noted that neural networks involving sigmoidal functions can be made to approximate the solution to an $l_\infty$ norm based optimization problem or can be used to minimize other nonlinear functions such as Q-functions. The Ren reference showed that in fact it is advantageous to optimize over the $l_\infty$ norm to derive a set of filter coefficients that minimize the worst case error away from the desired constellation points (e.g., PAM decision points). While the least squares solution provides a filter that minimizes the error on average, the $l_\infty$ solution minimizes the worst case error. The Ren reference reports that this reduces symbol error rates by about 35% in some cases.

The DFE is well known to perform significantly better than a feed-forward only equalizer having the same number of taps. As discussed herein, because our feed forward filters are sampled at a higher rate, the DFE feedback filter also uses fewer samples to span a wider window of time. However, in some cases, the values in the DFE feedback tapped delay line carry more than just one bit of information so require slightly more complex processing. As discussed hereinabove, for example, with 4-level PAM vs. 2-level PAM, the feedback processing is carried out with relatively simple shift-add circuits as opposed to adder-only circuits. Similar but slightly more complicated shift-add circuits can be designed for other small numbers of bits to accommodate, for example, 8-level PAM without deviating from the concepts of the present invention. In any case, though, the DFE is known to provide a significant improvement in noise margin over feed-forward only equalizers. The DFE-CTC as introduced in the parent application uses decision feedback to improve over the feed-forward-only structure of the Ren reference. While the parent discussed the use of non-linear optimization, here we specifically discuss how to solve for the coefficients of these improved structures.

One aspect of the new disclosure added to this CIP application is to explicitly perform $l_\infty$ optimization over a set of training data instead of $l_2$ optimization as discussed in the parent application. However, it is noted that the parent application indicates other optimization schemes such as neural optimization schemes could alternatively be used. One common neural optimization scheme uses error-back propagation with sigmoidal functions, and this can be used to approximate the $l_\infty$ solution. However, as pointed out by Ren, the $l_\infty$ optimization may be performed using linear programming. Hence the present CIP explicitly contemplates a system that uses linear programming to solve for an $l_\infty$ solution of the DFE and the DFE-CTC. That is, linear programming can be used to derive an $l_\infty$ optimal DFE-CTC solution in addition to the feed-forward-only structure considered by Ren.

As discussed in the parent application, the data buffer 305 can be expanded to include samples from one or more adjacent wires. In such a system the aforementioned matrix-based training algorithm will derive a set of weights for these taps to minimize cross talk. In such systems the buffer 305 is fed from multiple input sources using the same approach as is illustrated at the top of FIG. 4. In this type of embodiment the feed-forward buffer receives inputs from multiple ADCs in order to combat cross talk. In such systems the training data is collected in parallel and different training signals are used on a selected number of adjacent wires. The training is otherwise performed in the same manner as described above. In this embodiment matrix row still contains the contents of the buffers 305 and 310, but the source of the information in the buffer 305 comes from more than one ADC. Similarly, the parent application discussed that one or more decisions from adjacent channels may be fed back to the decision buffer 310 so that the decision feedback portion of the DFE-CTC can take into account latent cross talk effects due to previously detected symbols from one or more wires. The way the matrix least squares problem is solved to derive the optimal least squares coefficients is discussed above and was disclosed in the parent application.

The new disclosure of the current CIP contemplates that just as we have set up the DFE and DFE-CTC problems in the parent application as finding a least squares solution to over-constrained linear system, so can we solve for the $l_\infty$ optimal DFE-CTC using linear programming. It is somewhat counter intuitive to solve for the coefficients of a nonlinear feedback structure using linear feed forward equations and linear programming, but is exactly how we set up the problem herein. This is possible because the training data is known in advance. Hence the correct decision values are known in advance and may be considered to be separate feed-forward inputs of a multi-channel-feed-forward-only structure. While the DFE involves nonlinear operations and feedback channels, during training at least, the system may be modeled as a multi-channel feed forward system and solved for as an over-constrained linear system. In such cases we seek to find the set of coefficients that minimize the norm of an error function. The use of low resolution over-sampling fact and noise shaping pre-filters (delta sigma pre-processing, for example with a $1-z^{-1}$ transfer function), does not complicate the linearity of the system model.

In the discussion that follows, we now present an alternative embodiment of the method 700. The figure and reference numerals are the same as in the discussion of FIG. 7 provided above, but we now focus on the particular details of the new embodiment. We again make special note here that because the electrical characteristics of the computer system housing the bus wire(s) to be equalized are relatively constant, we can perform the method 700 at the factory. Moreover, depending on the algorithm implementation, we can make use to starting values that are based on a set of nominal values. This may greatly reduce training time per system depending on the implementation of the linear programming based optimization software. Most systems of the same run at the factory will have almost the same set of coefficients. When iterative optimization methods are used, we can start with the nominal values and make the adjustments to arrive at the final values. Also, each time a user boots up the system, the method 700 may not have to be performed. We can run a fast check and if the bit error rate is low enough, we can leave the system as it is. If there are errors (for example due to sever temperature changes or other factors) the old values may be used as starting values and the method 700 can be used to adjust the values to a new set of values, either at boot time or where a degradation of performance occurs.

In the first step 705, initial boot procedures are executed to initialize the processing state of the processor 105. System boot procedures are normally performed using the standard bus 155 or on-chip memory to support initial program execution and system configuration. Initially the transceivers 110 or 135 can operate the data paths 115 and/or 140 at lower speeds in order to read and write data reliably. For example, if the memory subsystem module 120 is a DRAM array, during boot time the transceiver 110 may write a known reference sequence out to the DRAM array. In some cases external devices may store a reference sequence in nonvolatile memory to avoid the need to write out a reference sequence. In practice, because the pervious set of values can be stored in nonvolatile RAM (EPROM or Disk) and can be read out at boot time, usually the saved set of parameters will be sufficient.

Once certain boot procedures are performed, and as either a part of an overall system boot procedure, or as a part of a one-time factory tuning procedure, control next passes to a step 710. In the step 710 one or more training sequences are read over one or more high-speed wires such as the bus 115. This sequence is read at a target operating speed and is digitized by the ADC 205. Control next passes to a step 715 where a locally available version of the reference pattern is accessed from memory. Preferably the training pattern involves a symbol sequence comprising two level of four level data (two bits per symbol, interpreted as either $\{-1, 1\}$ or $\{-2, -1, 1, 2\}$). More levels may be used, but the optimized shift-add circuits for relatively short word widths as discussed hereinabove need to be extended and become more and more complex as more symbol levels are added.

Control next passes to a step 720 where an adaptation algorithm is applied. As discussed in the parent application this may be set up as an over-constrained system of linear equations and solved for a solution (coefficient vector) that minimizes a particular error norm such as a least squares error norm. To minimize the $l_\infty$ norm instead via linear programming, the problem is set up similarly. Suppose there are N values in the training sequence, and that $W_{FF}$ has $N_{FF}$ elements and $W_{FB}$ has $N_{FB}$ elements. Then a matrix $A \in R^{(N^{FF+N_{FB}})}$ is constructed whose $k^{th}$ row contains the contents of the data buffer 305 at time k based on the sampled input. Recall the input is generally over sampled at low resolution and is preferably passed through a delta sigma filter such as one with a transfer function $1-z^{-1}$. The $k^{th}$ row also contains the contents of the data buffer 310 at time k. That is, the $k^{th}$ row is formed by augmenting the contents of the buffer 305 with the contents of the buffer 310. The contents of the data buffer 310 are derived from "previously decided" samples drawn directly from the set of known reference values (training sequence). It can be noted that the matrix A may be constructed in many ways depending on the exact ordering of elements in the $k^{th}$ row, but in many embodiments a block Toeplitz or a block Hankel matrix will result. Next a vector $b \in R^N$ is constructed, also using known reference values of the training sequence. The $k^{th}$ element of the vector b contains the correct decision the equalizing receiver is supposed to make at time k.

Next specifically consider how the linear system of equations is configured to deal with cross talk suppression. Consider the case where different training signals are used for different wires. This will generally give rise to better conditioned data. However, the same training signal may be run through some or all of the wires. Consider also that we will solve the problem for a set of L wires. The number L may be equal to the number of wires in the bus, or may be less, because often the cross talk contributions from only a set of nearest neighboring wires are relevant and there is a diminishing return for reducing cross talk from far away wires. In order to obtain parsimony, well conditioned data matrices and minimized hardware complexity, it is generally advantageous to only optimize to eliminate cross talk from wires that provide a non-negligible contribution to the cross talk.

Now if there are L wires being considered, instead of constructing a row by concatenating the tapped delay line of the feed forward buffer 305 and the feedback buffer 310, we construct a row by concatenating L feed forward buffers 305 from the L wires we wish to take into consideration to reduce cross talk. We also take L feedback buffers 310 from the same set of L wires and concatenate them into the same row. In general, however, it is possible to concatenate $L_1$ feed forward buffers and $L_2$ feedback buffers where $L_1$ and $L_2$ are different. The number L, or the numbers $L_1$ and $L_2$ would be considered to be parameters that one of ordinary skill in the art could choose experimentally or by simulation for a given system. In order to keep the disclosure simple, we will assume that L feed forward and L feedback channels are used in the discussion that follows. This is without loss of generality, because one could optionally choose $L_1$ feed forward buffers and $L_2$ feedback buffers where $L_1$ and $L_2$ are different.

To construct a row of the matrix, then, we concatenate L feed forward buffers and L feedback buffers. For example, the feed forward buffers have the oversampled 1-bit data that has optionally been processed by a delta sigma modulator (e.g., a quantizer and a filter with transfer function $1-z^{-1}$ or some other delta sigma noise shaping transfer function as is well known in the delta sigma conversion arts). This is optionally used to push the quantization noise into the high frequency spectrum so it can be filtered. Straight 1-bit conversion or the delta sigma modulated set of 1-bit values is generated by the A/D 205. We note that when delta sigma modulation is used, the ADC 205 is not a conventional delta sigma A/D converter but is rather a 1-bit A/D converter that produces an oversampled stream of delta-sigma modulated 1-bit samples. It is not outside the scope of the invention to use an n-bit A/D with optional n-bit delta-sigma modulated values, but in general the number n either one or is close to one. The A/D is not a standard A/D nor is it a standard delta sigma A/D that performs oversampling, delta sigma modulation, filtering and then down-sampling at full word width, but is a low resolution A/D with optional delta sigma modulation so the concepts of the invention may be employed.

To construct the set of linear equations, we next set an element in a vector on the right hand side of the equation to be equal to the training value for a given channel. Now when the problem Ax=b is solved for x, the vector x will contain the desired DFE-CTC coefficient values for a particular output channel. Similar matrix equations are constructed and solved for each output channel. The DFE-CTC coefficients for each output channel preferably combine with several input channels 305 from L wires and several feedback channels 310 from L wires as discussed above. We note that while this matrix formulation is provided, depending on the software implementation, the actual matrices do not need to be explicitly formed as we have described. For example if an LMS or RLS adaptation algorithm is used, or certain linear programming optimization software is used, these matrices may be merely mathematical constructs used to describe the system of linear equations, but need not be explicitly constructed in software.

Control next moves to step 725 where the coefficients are solved. As discussed previously, the system Ax=b is can be set up as an over-constrained linear system and solved for a least squares solution. However, as noted herein, the same data may be used in a linear programming based optimization algorithm to solve for a vector x that minimizes the $l_\infty$ norm of the error vector e=b−Ax. As mentioned in the parent application, other methods such as neural network based optimization algorithms, and in general, nonlinear optimization algorithms can be used as well. However, for $l_\infty$ norm minimization it appears most efficient to set the problem up as a linear problem and to solve it using linear programming, as we have indicated. That is, using the results of the Ren reference and the problem construction provided herein, an improved system results whereby a decision feedback equalizer and cross-talk canceller (DFE-CTC) is derived that minimizes the $l_\infty$ norm of the error vector e=b−Ax. While Ren's structure is completely feed-forward, we have recognized that as we have set up the problem, linear programming can be used to solve the system to compute the coefficients to minimize $l_\infty$ norm of the error even though the DFE-CTC algorithm itself involves non-linear processing and feedback.

Note that while the $l_2$ norm optimized solution appears to be preferable over $l_\infty$ norm optimized solution (least squares solution), the use of other error functions are contemplated by the present invention. In the parent application we indicated that nonlinear optimization algorithms such as neural networks could be applied to the present problem (DFE-CTC) instead a least squares solution. For example, the same linear system of equations as described above could be solved to minimize a statistical probability of error function. For example, assuming a Gaussian noise distribution and a linear channel, nonlinear error functions are known in communication theory based on Q-functions. These functions are derived by integrating over the error region of a probability density function. The error probability is a function of the coefficients, so such functions can be viewed as nonlinear functions of the coefficients and may be iteratively solved for a solution that minimizes the statistical error function over the training data. By minimizing the probability of error directly, we directly minimize the BER. Such solutions are optimal. It is also known how to construct nonlinear error functions to maximize the signal to noise ratio or to minimize the error probability for non-Gaussian channels, etc. Also, similar error functions can be constructed for multi-level signaling as well as the standard Q-functions used for binary signaling in Gaussian channels. An aspect of the present invention is to select an error function of choice, albeit complicated and non-linear, such as to minimize the error probability for a particular modulation type (e.g., 2-level or 4-level PAM) and a noise probability density function. Here the cross talk from the selected set of L adjacent wires is not considered as noise but the residual after cancellation is considered to be noise when selecting the noise probability density function to use in the model.

Next realize that the electrical characteristics of the computer bus will not change significantly over time, so even a complicated nonlinear optimization is completely practical if it is done, for example at the factory. Because nonlinear optimization software is generally iterative, only fine tuning would ever likely be needed in the future after the initial values are determined. Hence at boot time or once a performance degradation is noted, a few iterations of the nonlinear optimization algorithm may be applied to fine tune the system to a new operating point. With the teachings of the present invention, the problem has been reduced to the level that one of ordinary skill in the art could select the appropriate non-linear statistical error function or error functions, write the error functions in terms of the linear feed-forward filter equations described herein (comprising the feed forward section 305 and the DFE channels 310 which are themselves are modeled as feed-forward channels of known training data), and solve for the coefficient vector x using a customized or packaged non-linear optimization software to minimize the non-linear statistical error function for the chosen modulation type and noise probability density function.

Control next passes to an optional decision-step 730. The decision step 730 decides whether the selected norm of e=b−Ax has a small enough magnitude. Alternatively, the step 730 runs a second training sequence through the system and measures the residual error of the recovered waveform, $y_k$, in FIG. 2 and FIG. 3 (output of 235). If the error is sufficiently small enough to meet a bit error rate criterion, then the set is accepted. Other checks can be made or constraints added in order to insure the optimization algorithm converged to a stable and well conditioned solution. Otherwise the steps 710–725 are optionally repeated using a different data rate. Different speeds can be checked by starting at a target highest speed, working down until a speed is found that meets requirements. Alternatively the process can start with a lower speed and keep working up until a speed is reached where the system will not meet the bit error rate requirement. In either case, the set of coefficients that work at the highest possible speed are preferably selected and the system is preferably operated at top speed. For power consumption reasons, more than one set of coefficients may be maintained to operate the bus at different speeds because full speed may not be needed in all cases. At lower speeds, it may be possible to simply digitize the output of the ADC 205 as the symbol decision because the eye of the input waveform may not be closed. In such cases the receiver 300 may be optionally bypassed and put in a sleep mode. Also in low power mode, for example, the modulation could be switched from 4-level PAM to 2-level PAM to allow the ADC 205 to make the decisions directly without the need for further processing.

Control next passes to a step 735 where the coefficients are loaded into coefficient memory for system use in the coefficient RAM 335. When the optional step 730 is used, the step 735 may be performed as a part of the step 730. Also, in practical systems, the steps 710–725 may be precomputed and at boot up 705, control can pass directly to the step 730 to check to see if the precomputed values are still valid. Also the step 730 can be used to see whether improved values can be obtained. For example, if a certain computer performs better at lower temperature, and the old values were computed in the summer, and it is now winter, it may be that better performance can be achieved. This could cause the process to be re-evaluated. In some systems, the boot process can look at the calendar and periodically recheck the configuration on certain dates of the year, etc. The coefficient RAM may be implemented as volatile or non-volatile memory.

Control next passes to a step 740 where the system 100 is operated using, for example, the receiver structure 300 in at least one of the transceivers 110 or 135. The receiver 300 performs equalization using the trained coefficient sets $W_{FF}$ and/or $W_{FB}$. In general, $W_{FF}$ and/or $W_{FB}$ may respectively correspond to sets of coefficients that are applied to one or more feed forward and feed back channels using the DFE-CTC structure taught in the parent application. As discussed in the parent, feed forward only systems for single channel equalization and multi-channel crosstalk suppression are also possible. The system preferably operates in a multiplier-free manner to open a closed eye on an inter-module wire such as a high-speed inter-chip bus wire. This method allows systems to be constructed and operated that can dedicate some silicon area to attain increased inter-module data rates, thereby increasing overall system performance.

Although not shown, the error as measured at the output of the differencing circuit 235 may be periodically or continuously monitored during system operation. In one embodiment, the differencing circuit 235 is implemented in hardware and is used to accumulate and error level by passing the error magnitudes to a first order recursive (IIR) filter. If the error level exceeds a threshold, an interrupt is generated and training is performed again for one or more bus wires to bring the system back into alignment. This feature is also optional. One example of a way to maintain an error level in a multiplier-free way is to use a recursive filter of the form $p_m=(1-2^{-7})Pk_{-1}+|e_k|$. In 8-bit arithmetic, this only requires a shift-add operation. Saturating arithmetic may also be used, and that involves an extra operation for saturation control.

Now that the system and its operation have been described, a specific preferred mode of operation will be discussed in light of FIGS. 1–7. In a preferred mode of operation the ADC 205 is selected to be an oversampling delta sigma encoder (e.g., 1-bit sampling and a transfer function $1-z^{-1}$). The quantizer in the delta sigma encoder may alternatively be selected to be either one, two or four bits, for example. The oversampling rate is typically chosen to be an integer, OSF (over-sampling factor), between one and sixteen, although this is not a requirement. For example, suppose the OSF parameter is set to two or four. This causes the data-clocking rate into the buffer 305 to be two or four times the symbol rate. If the serial type shifter/negator/accumulator 600 is used, running accumulations using two or four cycles each may be produced during a data symbol interval. This reduces the amount of hardware needed to implement the adder array 340. Still, no multipliers are required, just simple one-bit shift devices and add/subtract type circuits.

The delta sigma data stream output from the ADC 205 is noisy, but the feed-forward filter $W_{FF}$ has been adapted during training to take this into account. The fact that a delta sigma modulator has been used allows the system to recover information with greater reliability and fidelity than when it was originally sampled. In essence, feed forward paths of the DFE-CTC act as both an equalizer and as the delta sigma decoder itself which performs the needed low pass filtering operation in delta sigma decoding. While delta sigma converters are normally designed to recover a large number of bits, the present invention is only concerned with quantizing to a small number of signal constellation points reliably. The sigma delta converter at the input allows equalization to be performed at very high clock rates with very simple hardware. When the input symbol rate is on the order of 800 MHz or higher, and when a given chip may require eight to thirty-two or more receivers for a given high speed bus, an architecture that can operate at very high clock rates with a minimum silicon footprint becomes crucial. This is achieved by the present invention by sampling (preferably oversampling) an input signal with a very low resolution and passing the signal through a high-speed, low complexity equalization device.

Another aspect of the present invention involves a mode of operation for the multi-drop bus 145. The receiver 135 may be required to receive signals that originate from more than one high-speed data source 150. In such cases the channel characteristics between the receiver 135 and each of the high-speed data sources 150 will generally be different. In such cases different sets of coefficients are preferably developed for each channel. The method 700 is carried out as illustrated in FIG. 7, but an extra feedback path (multi-drop) is provided from the step 735 to the step 710. The same receiver structure 300 is used, but the coefficient RAM 335 selectively outputs an appropriate set of coefficient values depending on from which of the sources 150 data is being received. In terms of FIG. 4, this involves adding standard memory addressing and output multiplexing circuits to the coefficient RAM 335. The construction of addressable memories is well known in the art.

Another point to be made in the CIP application is that data rates are increasing. While the parent application discussed inter-chip busses that operate on the order of 800 MHz, in the future these rates will rise into the 1.5 GHz range, 2 GHz range, and beyond. The present application and the parent invention will play a role in this advance. While the parent application disclosed the DFE-CTC structure to reduce cross talk using a least squares solution, we have shown herein that the DFE-CTC can be derived to minimize the $l_\infty$ norm of the error $e=b-Ax$ using linear programming algorithms and software. Using our matrix formulation, this can be stated as minimizing the worst case deviation away from the PAM levels of the received interchip wire data signal given the effects of the transfer function of the inter-chip wire itself and the effects of cross talk from adjacent wires. As previously discussed we can likewise use nonlinear optimization algorithms and software to directly solve for a set of DFE-CTC coefficients that minimize a nonlinear function such as a statistical error probability function (like a Q-function) to thereby minimize the BER (bit error rate) or to maximize the signal to noise ratio. While this is generally more costly than the least squares approach and the linear programming approach, it is practical in relatively stationary environments such as those involving computer buses.

It is also recognized that certain aspects of the systems and methods provided herein can be used in other types of embodiments where the input data is not sampled at just one or two bits with over sampling and possibly using a delta sigma modulator. That is, the same matrix formulation can be used when no over sampling is applied and data is collected with a full resolution A/D. Likewise, the same matrix formulation can be used when the input data is over sampled but is collected with one or more full resolution A/D converters. By full resolution we mean the A/D has at least as many bits as the data symbol for cases where the data symbol has more than one bit. For example a full resolution A/D converter may have 8 or 12 bits of resolution and the data symbol could have 1, 2, 4, 8, 16 . . . 256, etc., levels, assuming PAM. A fractionally spaced feed forward equalizer (oversampled input) is optional in these embodiments. However the invention can also be used with QAM and other types of modulation. While the low cost multiplier free circuits will not be available in such embodiments, they may not be needed, for example if the invention is applied to a standard communication channel such as a twisted pair telephone cable or a coaxial cable.

The aspects of the present invention that apply to standard channel such as the communication channels mentioned above involve the DFE and the DFE-CTC structures that have been designed to minimize the $l_\infty$ norm using linear programming techniques or to minimize a statistical error probability function using nonlinear optimization techniques. While least squares solutions to DFEs were previously known, the $l_\infty$ norm minimization technique using linear programming techniques was not understood. Because the DFE is a nonlinear structure, it was not recognized that it could be solved as an $l_\infty$ norm minimization problem using linear programming. Hence one aspect of the present invention is a DFE that is adapted using linear programming to solve for an $l_\infty$ solution. The steps 720 and 725 are implemented as discussed for this particular type of embodiment as set forth above. Another aspect is that the DFE-CTC structure can be solved to minimize cross talk on a set of twisted pair wires in a cable as discussed below.

It is also contemplated that an iterative algorithm used to converge to a solution in a linear programming solver could be modified to operate as a block adaptive algorithm to produce an adaptive filter. In this type of embodiment, streaming data is segmented into blocks of data. Either a training signal as is common in adaptive filters theory or a decision feedback signal can be used to on the right hand side of the linear equations as discussed above. As a new block of data is gathered, one or more linear programming iterations are taken to update the previous set of coefficients to a new set of coefficients. The block size could be any size all the way down to one new sample per block with a sliding window all the way to N-sample non-overlapping blocks. This provides a new class of adaptive filters that solve for the $l_\infty$ norm solution. It is expected that such a class of adaptive filters would be useful in minimizing bit error rates in various types of communication systems problems. That is, $l_\infty$ norm minimizing adaptive equalizers, echo cancellers, and adaptive noise cancellers such as cross talk canceller could be constructed using block-adaptive methods. Likewise, the same approach can be taken to construct a block-adaptive nonlinear filter that applies one or more nonlinear optimization iterations to a new data block starting with the coefficients from a previous data block, where the iterations are performed to minimize a nonlinear function such as a probability of error function like a Q-function written in terms of the DFE-CTC coefficients.

Another aspect of the present invention is a DFE that is solved using linear programming to achieve an $l_\infty$ norm solution. The Ren reference only solves this problem for feed-forward structures, but we have shown it can be applied to structures involving decision feedback for both equalization and crosstalk cancellation. Moreover, we have formulated the problem so that the system can be optimized for inter-chip and inter-module embodiments where very low cost multiplier free arithmetic is needed. However, our solutions can be applied to standard DFE structures as well in order to provide an $l_\infty$ norm solution. Also, we have shown that the DFE-CTC can be solved similarly. We note here that it is fully contemplated that the DFE-CTC can be designed for communication channels where NEXT (near end cross talk) and FEXT (far end cross talk) are common impairments. For example, cables involving multiple twisted pairs often have cross-talk problems and the set of linear equations for the DFE-CTC defined in the parent and the CIP application can be used to solve for the DFE-CTC coefficients for an $l_\infty$ norm solution. Alternatively the aforementioned nonlinear oriented methods to minimize nonlinear error functions may also be used in this context.

Hence it is to be understood that while the specific embodiments for interchip and inter-module communications involving low-resolution over sampled inputs (with delta sigma encoding in some cases) are specially tailored embodiments that use the multiplier-free structures as disclosed herein or similar low cost hardware structures that are generally multiplier free (use only adders or adders and a limited amount of shifting). The $l_\infty$ norm solutions provided herein may be applied more generally to any equalizer, cross talk canceller, or equalizer and cross talk canceller as may be needed in inter-chip communication wire trace runs, inter-module communication wire trace runs, or communication systems in general such as cables housing twisted pairs, or even coaxial cables.

As discussed above, the concepts of the parent application and the additional matter in the CIP can also be applied to inter-module busses on large chips and wafers. While it is counter intuitive to use complex multi-channel equalizer and cross talk suppression in inter-chip and inter-module data wires, it makes perfect sense when the low cost multiplier-free structures of the parent application are used. As the transistor count increases, it makes sense to use some of these transistors to focus on the main system bottle neck that is either reducing I/O bandwidth or the on-chip clock rate.

Because long wire runs on a semiconductor cause the clock for the whole system to slow down, it makes the most sense to dedicate some transistors to allow the clock to be sped up and/or to increase the I/O bandwidth without the need to keep going to wider busses.

Although the present invention has been described with reference to specific embodiments, other embodiments may occur to those skilled in the art without deviating from the intended scope. It should be noted that certain novel aspects of the present invention involve improved inter-module communication links for high-speed busses in computerized systems, but some of the more general concepts could be applied to other systems as well. For example, the receiver 300 could be used in other types of applications such as wireline telecommunication systems and inter-computer cabling. For such systems the design constraints would change. Therefore, it is to be understood that the invention herein encompasses all such embodiments that do not depart from the spirit and scope of the invention as defined in the appended claims.

What is claimed is:

1. A second semiconductor chip for use in equalizing a transfer function of an inter-chip high-speed bus wire trace on a circuit board, wherein the inter-chip high-speed bus wire trace electrically couples an output pad of a first semiconductor chip to an input pad of the second semiconductor chip, the second semiconductor chip comprising:
   the input pad that couples to the inter-chip high-speed bus wire;
   a 1-bit sampling circuit coupled to said input pad and operative to convert an analog signal received on said input pad to a stream of 1-bit digital sample values, wherein the sampling circuit produces its stream of 1-bit digital sample values at a specified sampling rate;
   an equalizer that processes said stream of 1-bit digital sample values using a feed forward filter channel that includes a multiplier free adder-based circuit that combines a set of equalizer coefficients of a coefficient vector with one or more of the 1-bit digital sample values to produce a recovered signal sequence, wherein the recovered signal sequence has a reduced sample rate that is at least two times less than said specified sampling rate, wherein said equalizer further comprises at least one decision feedback stage which adds a decision feedback component to the recovered signal sequence to compute an estimated symbol sequence, and wherein the equalizer is characterized in that its coefficient vector substantially minimizes a measure of a residual error signal; and
   a decision circuit coupled to receive the estimated symbol sequence and operative to generate a stream of recovered symbol values.

2. The semiconductor chip of claim 1, wherein said equalizer is adapted at power-up and is then operated with a fixed set of digital filter coefficients for an extended period of time.

3. The semiconductor chip of claim 2, wherein said extended period of time ends when a decision-error signal exceeds a threshold.

4. The semiconductor chip of claim 1, wherein said equalizer comprises at least one feed-forward FIR filter and the multiplier free adder-based circuit comprises an adder-tree network.

5. The semiconductor chip of claim 1, wherein said decision circuit comprises a direct-signal slicer.

6. The semiconductor chip of claim 1, wherein said 1-bit sampling circuit is coupled to a sigma-delta quantizer.

7. The semiconductor chip of claim 1, wherein said decision circuit produces n-bit values where n is greater than one.

8. The semiconductor chip of claim 1, said decision circuit produces n-bit values where n is equal to one.

9. The semiconductor chip of claim 1, wherein said equalizer comprises set coefficients that are computed by constructing and solving an $l_\infty$ optimization problem using a linear programming optimization algorithm using at least one block of collected training data, and the measure of the residual error function is the $l_\infty$ norm.

10. A second semiconductor chip for use in equalizing a transfer function of a first inter-chip high-speed bus wire trace on a circuit board and for reducing cross-talk caused by a set of one or more second high-speed bus wire traces, wherein the first inter-chip high-speed bus wire trace electrically couples an output pad of a first semiconductor chip to a first input pad of the second semiconductor chip, and the set of one or more second high-speed bus wire traces are collocated on the circuit board with the first inter-chip high-speed bus wire trace, the second semiconductor chip comprising:
   the input pad that couples to the first inter-chip high-speed bus wire trace;
   a set of one or more second input pads that each couple to a respective one of the set of one or more second high-speed bus wire traces;
   a plurality of 1-bit sampling circuits, wherein at least one of the 1-bit sampling circuits is coupled to said first input pad and others of the 1-bit sampling circuits are coupled to respective ones of said set of one or more second input pads, wherein each 1-bit sampling circuit is operative to convert an analog signal received on its respective input pad to a respective stream of 1-bit digital sample values, wherein each said sampling circuit produces its respective stream of 1-bit digital sample values at a first sampling rate;
   a plurality of feed-forward filter channels that each linearly combine a respective stream of 1-bit digital sample values using a respective multiplier free adder-based circuit to produce a respective output sequence, wherein each said output sequence has a second sampling rate that is at least two times less than said first sampling rate;
   one or more decision feedback filter channels that each linearly combine a respective stream of digital decision values to produce a respective output sequence, wherein the input and output of each said decision feedback both have data rates equal to the second sampling rate;
   a linear combining circuit coupled to the outputs of each of the plurality of feed-forward filter channels, the linear combining circuit operative to linearly combine the outputs of each of the plurality of feed-forward filter channels; and
   a decision circuit coupled to receive the output of the linear combining circuit and operative to process the output of the linear combining circuit to generate a stream of recovered symbol values;
   wherein the feed forward filter channels and the one or more decision feedback filter channels each comprise a respective set of filter coefficients that are computed to equalize the transfer function of the first inter-chip high-speed bus wire trace and to reduce the effect of crosstalk produced by a set of signals that traverse the set of one or more second high-speed bus wire traces by selecting the set of filter coefficients to substantially minimize a measure of an error signal that represents the error between a set of the estimated decision values as computed by the linear combiner and a set of known training data values.

11. The semiconductor chip of claim 10, wherein said plurality of the coefficients of the feed-forward filter channels and the at least one decision feedback filter are computed at power-up and are then operated with a fixed set of digital filter coefficients for an extended period of time.

12. The semiconductor chip of claim 11, wherein said extended period of time ends when a decision-error signal exceeds a threshold.

13. The semiconductor chip of claim 10, wherein said plurality of the coefficients of the feed-forward filter channels and the at least one decision feedback filter are computed at the factory and are set.

14. The semiconductor chip of claim 10, wherein said plurality of feed-forward filter channels each comprise a set of coefficients that are computed by constructing and solving an optimization problem using at least one block of collected training data.

15. The semiconductor chip of claim 10, wherein each said respective multiplier free adder-based circuit comprises an adder-tree network.

16. The semiconductor chip of claim 10, wherein the linear combiner comprises an adder-tree network.

17. The semiconductor chip of claim 10, wherein the measure of error is the $l_\infty$ norm, and the coefficients are computed using a linear programming based optimization routine.

18. The semiconductor chip of claim 10, wherein at least one of said 1-bit sampling circuits is implemented using a sigma-delta quantizer.

19. The semiconductor chip of claim 10, wherein said decision circuit produces n-bit values where n is greater than one.

20. The semiconductor chip of claim 10, said decision circuit produces n-bit values where n is equal to one.

21. An equalizer that processes a communication signal, the equalizer comprising:

a 1-bit sigma-delta quantizer operative to convert an input analog signal representative of a received version of the communication signal to a stream of 1-bit sigma-delta quantized sample values, wherein the 1-bit sigma-delta quantizer produces its stream of 1-bit sigma-delta quantized sample values at a specified sampling rate;

a feed forward filter that processes the stream of 1-bit sigma-delta quantized sample values using a multiplier free adder-based circuit that logically combines a set of equalizer coefficients of a coefficient vector with one or more of the 1-bit sigma-delta quantized sample values so as to produce a recovered signal sequence, wherein the recovered signal sequence has a reduced sample rate that is at least two times less than the specified sampling rate, and the coefficient vector is selected to minimize a measure of error in the recovered signal sequence; and a decision circuit coupled to receive the recovered signal sequence and operative to generate a stream of recovered symbol values therefrom.

22. The equalizer of claim 21, further comprising:

a decision feedback stage, wherein one or more previously generated recovered symbol values are processed and combined with the recovered signal symbol sequence to provide a decision-feedback-augmented recovered signal symbol sequence.

23. The equalizer of claim 21, further comprising:

an adaptation module that processes training data and computes the equalizer coefficient vector so as to minimize the measure of error in the recovered signal sequence in response to the training data.

24. The equalizer of claim 21, wherein the measure of error is a member of the group consisting of an $l_2$-norm, an $l_\infty$-norm, and a nonlinear measure evaluated by a neural network.

25. The equalizer of claim 21, wherein the equalizer is employed to equalize a transfer function of a chip-to-chip trace on a circuit board.

* * * * *